United States Patent
Holtcamp et al.

(10) Patent No.: US 11,041,029 B2
(45) Date of Patent: *Jun. 22, 2021

(54) ALUMINUM ALKYLS WITH PENDANT OLEFINS FOR POLYOLEFIN REACTIONS

(71) Applicant: ExxonMobil Chemical Patents Inc., Baytown, TX (US)

(72) Inventors: Matthew W. Holtcamp, Huffman, TX (US); Gregory S. Day, College Station, TX (US); John R. Hagadorn, Houston, TX (US); Patrick J. Palafox, Hattiesburg, MS (US); Ramyaa Mathialagan, Baytown, TX (US); Jo Ann M. Canich, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/744,478

(22) PCT Filed: Aug. 10, 2016

(86) PCT No.: PCT/US2016/046411
§ 371 (c)(1),
(2) Date: Jan. 12, 2018

(87) PCT Pub. No.: WO2017/039995
PCT Pub. Date: Mar. 9, 2017

(65) Prior Publication Data
US 2018/0194872 A1 Jul. 12, 2018

Related U.S. Application Data

(60) Provisional application No. 62/332,940, filed on May 6, 2016, provisional application No. 62/212,405, filed on Aug. 31, 2015.

(30) Foreign Application Priority Data

Jun. 28, 2016 (EP) .................................. 16176533

(51) Int. Cl.
*C08F 4/659* (2006.01)
*C08F 10/02* (2006.01)
(Continued)

(52) U.S. Cl.
CPC ............ *C08F 4/65912* (2013.01); *C08F 8/06* (2013.01); *C08F 8/12* (2013.01); *C08F 8/42* (2013.01);
(Continued)

(58) Field of Classification Search
None
See application file for complete search history.

(56) References Cited

U.S. PATENT DOCUMENTS

| 4,874,734 A | 10/1989 | Kioka et al. |
| 5,122,491 A | 6/1992 | Kioka et al. |

(Continued)

FOREIGN PATENT DOCUMENTS

| CN | 101503487 | 8/2009 |
| EP | 0511665 | 11/1992 |

(Continued)

OTHER PUBLICATIONS

Nam et al. Macromolecules, 35, 6760-6762 (Year: 2002).*
(Continued)

*Primary Examiner* — Yun Qian

(57) ABSTRACT

This invention relates to organoaluminum compounds, organoaluminum activator systems, preferably supported, to polymerization catalyst systems containing these activator systems and to polymerization processes utilizing the same. In particular, this invention relates to catalyst systems com- (Continued)

Scheme I prising a support, an organoaluminum compound and a metallocene.

8 Claims, 4 Drawing Sheets

(51) Int. Cl.
| | |
|---|---|
| C08F 8/06 | (2006.01) |
| C08F 8/12 | (2006.01) |
| C08F 8/42 | (2006.01) |
| C08F 10/06 | (2006.01) |
| C08F 4/6592 | (2006.01) |
| C08F 2/34 | (2006.01) |

(52) U.S. Cl.
CPC ............. *C08F 10/02* (2013.01); *C08F 10/06* (2013.01); *C08F 2/34* (2013.01); *C08F 4/65916* (2013.01); *C08F 4/65925* (2013.01); *C08F 4/65927* (2013.01)

(56) References Cited

U.S. PATENT DOCUMENTS

| | | | |
|---|---|---|---|
| 5,155,078 | A | 10/1992 | Kioka et al. |
| 5,234,878 | A | 8/1993 | Tsutsui et al. |
| 5,308,811 | A | 5/1994 | Suga et al. |
| 5,654,248 | A | 8/1997 | Kioka et al. |
| 5,830,820 | A | 11/1998 | Yano et al. |
| 5,928,982 | A | 7/1999 | Suga et al. |
| 5,973,084 | A | 10/1999 | Suga et al. |
| 6,040,261 | A | 3/2000 | Hlatky |
| 6,048,817 | A | 4/2000 | Sagae et al. |
| 6,103,657 | A | 8/2000 | Murray |
| 6,147,173 | A | 11/2000 | Holtcamp |
| 6,211,105 | B1 | 4/2001 | Holtcarrp |
| 6,239,062 | B1 | 5/2001 | Cribbs |
| 6,274,684 | B1 | 8/2001 | Loveday et al. |
| 6,333,423 | B1 | 12/2001 | Kol et al. |
| 6,353,063 | B1 | 3/2002 | Shimizu et al. |
| 6,368,999 | B1 | 4/2002 | Speca |
| 6,376,416 | B1 | 4/2002 | Hirakawa et al. |
| 6,376,629 | B2 | 4/2002 | Nagy et al. |
| 6,399,535 | B1 | 6/2002 | Shih et al. |
| 6,414,162 | B1 | 7/2002 | Nagy |
| 6,451,724 | B1 | 9/2002 | Nifant'ev et al. |
| 6,489,480 | B2 | 12/2002 | Rodriguez |
| 6,531,552 | B2 | 3/2003 | Nakano et al. |
| 6,559,090 | B1 | 5/2003 | Shih et al. |
| 6,596,827 | B2 | 7/2003 | Kol et al. |
| 6,664,348 | B2 | 12/2003 | Speca |
| 6,734,131 | B2 | 5/2004 | Shih et al. |
| 6,844,389 | B2 | 1/2005 | Mehta et al. |
| 6,900,321 | B2 | 5/2005 | Boussie et al. |
| 6,943,224 | B2 | 9/2005 | Shih |
| 6,953,764 | B2 | 10/2005 | Frazier et al. |
| 7,183,348 | B2 | 2/2007 | Reinking et al. |
| 7,220,695 | B2 | 5/2007 | Casty et al. |
| 7,273,914 | B2 | 9/2007 | Wang et al. |
| 7,355,058 | B2 | 4/2008 | Luo et al. |
| 7,385,015 | B2 | 6/2008 | Holtcamp |
| 7,754,840 | B2 | 7/2010 | Loveday et al. |
| 7,973,116 | B2 | 7/2011 | Hagadorn et al. |
| 8,071,701 | B2 | 12/2011 | Klosin et al. |
| 8,080,613 | B2 | 12/2011 | Moad et al. |
| 8,110,518 | B2 | 2/2012 | Marin et al. |
| 8,394,902 | B2 | 3/2013 | Hagadorn et al. |
| 8,575,284 | B2 | 11/2013 | Luo et al. |
| 8,674,040 | B2 | 3/2014 | Hagadorn et al. |
| 8,710,163 | B2 | 4/2014 | Hagadorn et al. |
| 8,791,217 | B2 | 7/2014 | Hlavinka et al. |
| 8,907,032 | B2 | 12/2014 | Kol et al. |
| 8,937,137 | B2 | 1/2015 | Holtcamp et al. |
| 8,952,114 | B2 | 2/2015 | Giesbrecht et al. |
| 8,957,171 | B2 | 2/2015 | Giesbrecht et al. |
| 8,957,172 | B2 | 2/2015 | Giesbrecht et al. |
| 9,079,991 | B2 | 7/2015 | Ker et al. |
| 9,120,879 | B2 | 9/2015 | Giesbrecht et al. |
| 9,150,676 | B2 | 10/2015 | Kol et al. |
| 9,193,813 | B2 | 11/2015 | Kol et al. |
| 9,200,099 | B2 | 12/2015 | Kol et al. |
| 9,200,100 | B2 | 12/2015 | Kol et al. |
| 9,249,238 | B2 | 2/2016 | Hagadorn et al. |
| 9,260,552 | B2 | 2/2016 | Hagadorn et al. |
| 9,290,589 | B2 | 3/2016 | Evans et al. |
| 9,315,593 | B2 | 4/2016 | Hagadorn |
| 9,315,602 | B2 | 4/2016 | Yamashita et al. |
| 9,321,858 | B2 | 4/2016 | Hagadorn et al. |
| 2002/0019503 | A1 | 2/2002 | Kol et al. |
| 2002/0038036 | A1 | 3/2002 | Resconi et al. |
| 2002/0123582 | A1 | 9/2002 | Speca |
| 2002/0142912 | A1 | 10/2002 | Boussie et al. |
| 2003/0027950 | A1 | 2/2003 | Uchino et al. |
| 2003/0096698 | A1 | 5/2003 | Shih et al. |
| 2003/0104928 | A1 | 6/2003 | Holtcamp |
| 2003/0213938 | A1 | 11/2003 | Farley et al. |
| 2005/0148743 | A1 | 7/2005 | Casty et al. |
| 2005/0245701 | A1 | 11/2005 | Oshima et al. |
| 2005/0267273 | A1 | 12/2005 | Kashiwa et al. |
| 2006/0155083 | A1 | 7/2006 | Nakayama et al. |
| 2006/0293470 | A1 | 12/2006 | Cao et al. |
| 2007/0185343 | A1 | 8/2007 | Verpoort et al. |
| 2010/0227990 | A1 | 9/2010 | Kuhlman et al. |
| 2011/0077369 | A1 | 3/2011 | Yukita |
| 2011/0082323 | A1 | 4/2011 | Small et al. |
| 2011/0092651 | A1 | 4/2011 | Arriola et al. |
| 2013/0035463 | A1 | 2/2013 | Cann et al. |
| 2013/0131294 | A1 | 5/2013 | Hagadorn et al. |
| 2013/0172498 | A1 | 7/2013 | Hlavinka et al. |
| 2013/0289227 | A1 | 10/2013 | Jensen et al. |
| 2014/0031504 | A1 | 1/2014 | Jacobsen et al. |
| 2014/0039137 | A1 | 2/2014 | Giesbrecht et al. |
| 2014/0039138 | A1 | 2/2014 | Giesbrecht et al. |
| 2014/0039139 | A1 | 2/2014 | Giesbrecht et al. |
| 2014/0121341 | A1 | 5/2014 | Holtcamp et al. |
| 2014/0128557 | A1 | 5/2014 | Giesbrecht et al. |
| 2014/0221587 | A1 | 8/2014 | Hagadorn et al. |
| 2014/0275454 | A1 | 9/2014 | Holtcamp et al. |
| 2014/0378720 | A1 | 12/2014 | Wu et al. |
| 2015/0025205 | A1 | 1/2015 | Yang et al. |
| 2015/0119540 | A1 | 4/2015 | Holtcamp et al. |
| 2015/0141601 | A1 | 5/2015 | Hagadorn et al. |
| 2015/0329652 | A1 | 11/2015 | Hlavinka |
| 2017/0088641 | A1 | 3/2017 | Holtcamp et al. |
| 2017/0096506 | A1 | 4/2017 | Ye et al. |
| 2017/0096507 | A1 | 4/2017 | Atienza et al. |
| 2017/0096508 | A1 | 4/2017 | Ye et al. |
| 2017/0096509 | A1 | 4/2017 | Atienza et al. |
| 2017/0096510 | A1 | 4/2017 | Ye et al. |
| 2017/0096511 | A1 | 4/2017 | Atienza et al. |
| 2018/0002352 | A1 | 1/2018 | Hagadorn et al. ............ 526/170 |
| 2018/0134816 | A1 | 1/2018 | Canich et al. ................ 526/170 |

FOREIGN PATENT DOCUMENTS

| | | | |
|---|---|---|---|
| EP | 1160261 | 12/2001 | |
| EP | 0 849 292 | 8/2002 | |
| EP | 2436703 | 4/2012 | |
| EP | 3037437 | 6/2016 | ............... C08F 2/23 |
| GB | 1002430 | 8/1965 | |
| GB | 1278516 | 6/1972 | |
| JP | H05025214 | 2/1993 | |
| JP | 1995033814 | 2/1995 | |
| JP | H11166011 | 6/1999 | |
| JP | H11166012 | 6/1999 | |
| JP | H11255816 | 9/1999 | |
| JP | 2000072813 | 3/2000 | |
| JP | 2000198812 | 7/2000 | |
| JP | 2001026613 | 1/2001 | |
| JP | 2001031720 | 2/2001 | |
| JP | 2001163908 | 6/2001 | |
| JP | 2001163909 | 6/2001 | |
| JP | 2001200010 | 7/2001 | |
| JP | 2001316414 | 11/2001 | |

(56) References Cited

FOREIGN PATENT DOCUMENTS

| | | |
|---|---|---|
| JP | 2001316415 | 11/2001 |
| JP | 2002020415 | 1/2002 |
| JP | 2002037812 | 2/2002 |
| JP | 2002060411 | 2/2002 |
| JP | 2002060412 | 2/2002 |
| JP | 2002069116 | 3/2002 |
| JP | 2004083773 | 3/2004 |
| JP | 3891905 | 12/2006 |
| JP | 3943959 | 7/2007 |
| JP | 2007254575 | 10/2007 |
| JP | 2007261211 | 10/2007 |
| JP | 2007262330 | 10/2007 |
| JP | 2007262335 | 10/2007 |
| JP | 2007262336 | 10/2007 |
| JP | 2007262338 | 10/2007 |
| JP | 2007262631 | 10/2007 |
| JP | 4615248 | 1/2011 |
| JP | 2011089019 | 5/2011 |
| JP | 2013124302 | 6/2013 |
| KR | 2012-0120640 | 11/2012 |
| KR | 101381879 | 11/2012 |
| WO | 97/48743 | 12/1997 |
| WO | 00/011044 | 3/2000 |
| WO | 00/22010 | 4/2000 |
| WO | 01/23442 | 4/2001 |
| WO | 01/30864 | 5/2001 |
| WO | 01/42320 | 6/2001 |
| WO | 2002/038628 | 5/2002 |
| WO | 02/088198 | 11/2002 |
| WO | 02/102811 | 12/2002 |
| WO | 03/064433 | 8/2003 |
| WO | 03/064435 | 8/2003 |
| WO | 2004/106390 | 12/2004 |
| WO | 2005/075525 | 8/2005 |
| WO | 2005/095469 | 10/2005 |
| WO | 2006/026748 | 4/2006 |
| WO | 2007/018804 | 2/2007 |
| WO | 2007/035492 | 3/2007 |
| WO | 2007/067965 | 6/2007 |
| WO | 2010/037059 | 4/2010 |
| WO | 2011/014533 | 2/2011 |
| WO | 2012/009369 | 1/2012 |
| WO | 2012/033670 | 3/2012 |
| WO | 2012/098521 | 7/2012 |
| WO | 2012/134614 | 10/2012 |
| WO | 2012/134615 | 10/2012 |
| WO | 2012/158260 | 11/2012 |
| WO | 2013/028283 | 2/2013 |
| WO | 2013/040276 | 3/2013 |
| WO | 2014/137927 | 9/2014 |
| WO | 2014/143202 | 9/2014 |
| WO | 2014/149361 | 9/2014 |
| WO | 2015/088819 | 6/2015 |
| WO | 2017/039994 | 3/2017 |
| WO | 2017/039995 | 3/2017 |

OTHER PUBLICATIONS

AkzoNobel, Product Data Sheet—Isoprenyl, Dec. 1, 2014, http://www.pcpds.akzonobel.com/PolymerChemicalsPDS/showPDF.aspx?pds_id=1348, 2 pgs.

Shiono, T. et al. (2013) "Facile Synthesis of Hydroxy-Functionalized Cycloolefin Copolymer using ω-Alkenylaluminium as a Comonomer," Macromolecular Chem. Phys., v.214, pp. 2239-2244.

LaPointe et al., "New Family of Weakly Coordinating Anions," Journal of the American Chemical Society, 2000, vol. 122, No. 39, pp. 9560-9561.

Kehr et al., "(N-Pyrrolyl)B(C6F5)2—A New Organometallic Lewis Acid for the Generation of Group 4 Metallocene Cation Complexes," Chemical European Journal, 2000, vol. 6, No. 2, pp. 258-266.

Nam et al., "Propene Polymerization with Stereospecific Metallocene Dichloride—[Ph3C] [B(C6F5)4] Using [omega]-Alkenylaluminum as an Alkylation Reagent and as a Functional Comonomer," Macromolecules, 2002, vol. 35, No. 18, pp. 6760-6762.

U.S. Appl. No. 61/779,435, filed Mar. 13, 2013 Holtcamp et al.
U.S. Appl. No. 62/149,799, filed Apr. 20, 2015 Ye et al.
U.S. Appl. No. 62/149,814, filed Apr. 20, 2015 Ye et al.
U.S. Appl. No. 62/168,302, filed May 29, 2015 Holtcamp et al.
U.S. Appl. No. 62/236,691, filed Oct. 2, 2015 Ye et al.
U.S. Appl. No. 62/236,697, filed Oct. 2, 2015 Ye et al.
U.S. Appl. No. 62/236,701, filed Oct. 2, 2015 Atienza et al.
U.S. Appl. No. 62/236,712, filed Oct. 2, 2015 Atienza et al.
U.S. Appl. No. 62/236,720, filed Oct. 2, 2015 Atienza et al.
U.S. Appl. No. 62/236,727, filed Oct. 2, 2015 Ye et al.
U.S. Appl. No. 15/051,421, filed Feb. 23, 2016 Atienza et al.

Barroso et al., "Chiral Diamine Bis(phenolate) TiIV and ZrIV Complexes—Synthesis, Structures and Reactivity," Eur. J. Inorg. Chem., 2011, pp. 4277-4290.

Bucheli et al., "Spherical Clay Conglomerates: A Novel Stationary Phase for Solid-Phase Extraction and 'Reversed-Phase' Liquid Chromatography," Analytical Chemistry, vol. 71(11), Jun. 1, 1999, pp. 2171-2178.

Busico et al., "Block Copolymers of Highly Isotactic Polypropylene via Controlled Ziegler-Natta Polymerization," Macromolecules, 2004, vol. 37, pp. 8201-8203.

Cipullo et al., "Improving the Behavior of Bis(phenoxyamine) Group 4 Metal Catalysts for Controlled Alkene Polymerization," Macromolecules, 2009, vol. 42, pp. 3869-3872.

Gibson et al., "Advances in Non-Metallocene Olefin Polymerization Catalysis," Chem. Rev. 2003, vol. 103, pp. 283-315.

Groysman et al., "From THF to Furan: Activity Tuning and Mechanistic Insight via Sidearm Donor Replacement in Group IV Amine Bis(phenolate) Polymerization Catalysts," Organometallics, 2003, vol. 22, pp. 3013-3015.

Groysman et al., "Diverse Structure-Activity Trends in Amine Bis(phenolate) Titanium Polymerization Catalysts," Organometallics, 2004, vol. 23, pp. 5291-5299.

Van Meurs et al., "Polyethylene Chain Growth on Zinc Catalyzed by Olefin Polymerization Catalysts: A Comparative Investigation of Highly Active Catalyst Systems across the Transition Series," J. Am. Chem. Soc., 2005, vol. 127, pp. 9913-9923.

Reybuck et al., "Amine Bis(phenolate) Zirconium Complexes: Influence of Ligand Structure and Cocatalyst on Copolymerization Behaivor," Macromolecules, 2005, vol. 38, pp. 2552-2558.

Su et al., "Oxo-Bridged Bimetallic Group 4 Complexes Bearing Amine-Bis(benzotriazole phenolate) Derivatives as Bifunctional Catalysts for Ring-Opening Polymerization of Lactide and Copolymerization of Carbon Dioxide with Cyclohexene Oxide," Organometallics, 2014, vol. 33, pp. 7091-7100.

Tshuva et al., "[ONXO]-Type Amine Bis(phenolate) Zirconium and Hafnium Complexes as Extremely Active 1-Hexene Polymerization Catalysts," Organometallics, 2002, vol. 21, pp. 662-670.

Valente et al., "Coordinative Chain Transfer Polymerization," Chemical Reviews, 2013, vol. 113, pp. 3836-3857.

Dolzine et al., "Intramolecular metal-double bond interactions : VII. intramolecular cyclization of alkenyl derivatives of lithium, aluminum, gallium and indium", Journal of Organornetailic Chemistry, 1974, vol. 78, No. 2, pp. 165-176.

U.S. Appl. No. 62/332,940, filed May 6, 2016 Holtcamp et al.
PCT/US2017/055131 filed Oct. 4, 2017 Hule et al.
U.S. Appl. No. 62/410,173, filed Oct. 19, 2016 Hule et al.

Tanaka et al., "Pseudo-living copolymerization of norbornene and ω-alkenylborane—Synthesis of monodisperse functionalized cycloolefin copolymer," Polymer, 2015, vol. 56, pp. 218-222.

Warwel et al., "Thermische Strukturisomerisierung der Additionsprodukte von HAl(iso-C4H9)2 an 1,4-Pentadiene," Justus Liebigs Annalen der Chemie, vol. 1975, Issue 4; pp. 642-649.

Hata, "Aluminium-Olefinic Double Bond Interaction in Alkeynlaluminium Compounds," Chemical Communications, 1968, vol. 1, pp. 7-9.

Shiono et al., "Isospecific Polymerization of Propene over TiCl3 Combined with Bis(.omega,-alkenyl)zinc Compounds," Macromolecules, 1995, vol. 28, No. 2; pp. 437-443.

(56) References Cited

OTHER PUBLICATIONS

Wang et al., "Long-Chain Branched Isotactic Polypropylene," Macromolecules, 2002, vol. 35, No. 10, pp. 3838-3843.

Dekrnezian et al., "Characterization and Modeling of Metallocene-Based Branch-Block Copolymers," Macromolecules, 2002, vol. 35, No. 25, pp. 9586-9594.

Vaughan et al., "Industrial Catalysts for Alkene Polymerization," Polymer Science: A Comprehensive Reference, vol. 3, 3.20, pp. 657-672.

Britovsek et al., "The Search for New-Generation Olefin Polymerization Catalysts: Life beyond Metallocenes," Angew. Chem. Int. Ed., 1999, vol. 38, vol. 4, pp. 428-447.

Froese et al., "Mechanism of Activation of a Hafnium Pyridyl-Amide Olefin Polymerization Catalyst: Ligand Modification by Monomer," Journal of the American Chemical Society, 2007, vol. 129, No. 25, pp. 7831-7840.

Guerin et al., "Conformationally Rigid Diamide Complexes of Zirconium: Electron Deficient Analogues of Cp2Zr," Organometallics, 1996, vol. 15, No. 26, pp. 5586-5590.

\* cited by examiner

Scheme I

ALUMINUM ALKYLS WITH PENDANT OLEFINS FOR POLYOLEFIN REACTIONS

PRIORITY AND CROSS REFERENCE TO RELATED APPLICATIONS

This application is the § 371 National Stage application for PCT/US2016/046411, filed Aug. 10, 2016, which claims priority to and the benefit of U.S. Ser. No. 62/332,940, filed May 6, 2016, and U.S. Ser. No. 62/212,405, filed Aug. 31, 2015. This application relates to 62/332,921, filed May 6, 2016.

FIELD OF THE INVENTION

The present invention relates to organoaluminum compounds, organoaluminum activator systems, preferably supported, to polymerization catalyst systems containing these activator systems and to polymerization processes utilizing the same. In particular, this invention relates to catalyst systems comprising supported organoaluminum compounds and, optionally, an olefin polymerization catalyst, such as a metallocene.

BACKGROUND OF THE INVENTION

Metallocene olefin polymerization catalyst systems typically use an activator (also called a co-catalyst) to generate the active catalytic species. In general, there are two catalyst activator families partially hydrolyzed aluminum alkyl complexes and non-coordinating anions (NCA's). Some of the most commonly employed activators used today are the partially hydrolyzed aluminum alkyls, more specifically, alumoxanes, such as methylalumoxane (MAO). In general, metallocene olefin polymerization systems that utilize NCA-type activators are more active than their MAO counterparts, but are also quite costly and much more sensitive to poisons which present a problem in catalyst synthesis, handling, storage and reactor operation. Alternatively, MAO-based systems are more robust than their NCA-type counterparts, but they suffer from the high cost of MAO production, the fact that MAO is typically used in large excess (relative to the amount of metallocene) and the limited shelf life of MAO.

In order to enhance polymer morphology, metallocene polymerization catalysts operated in industrial slurry and gas phase processes are typically immobilized on a carrier or a support, such as alumina or silica. Metallocenes are supported to enhance the morphology of the forming polymeric particles such that they achieve a shape and density that improves reactor operability and ease of handling. However, the supported versions of metallocene polymerization catalysts tend to have lower activity as compared to their homogeneous unsupported counterparts. In general, metallocene and single-site catalysts are immobilized on silica supports.

Likewise, alternative activators for metallocenes and other single-site polymerization catalysts have been the subject of numerous research efforts in recent years. For example, perfluorophenyl aluminum and borane complexes containing one anionic nitrogen-containing group may activate metallocenes. For example, R. E. Lapointe, G. R. Roof, K. A. Abboud, J. Klosin, J. Am. Chem. Soc., 2000, 122, 9560-9561, and WO 01/23442 A1 report the synthesis of $(C_6F_5)_3Al(imidazole)[Al(C_6F_5)_3][HNR'R'']$. In addition, G. Kehr, R. Frohlich, B Wibbeling, G. Erker, Chem. Eur. J., 2000, 6, No. 2, 258-266 report the synthesis of (N-Pyrrolyl)$B(C_6F_5)_2$. Supported activators containing a Group 13 element and at least one halogenated, nitrogen-containing aromatic group ligand for polymerization catalysts have been reported (U.S. Pat. Nos. 6,147,173 and 6,211,105).

JP 2007-262335A (2007-10-11); JP 2007-262336A (2007-10-11); JP 2007-262338A (2007-10-11); JP 2007-262330A (2007-10-11); and JP 2007-261211A (2007-10-11) disclose propylene polymerized with octenyldiisobutylaluminum in the presence of a zirconocene catalyst system.

JP 2007-254575A (2007-10-04) discloses ethylene-propylene copolymers prepared in the presence of alkenyldialkylaluminum, which are then oxidatively decomposed and converted to hydroxy group-containing units.

JP 2005-320420A (2005-11-17) discloses cyclic olefin-alkenyldialkylaluminum copolymers and manufacture of polar group-containing cyclic olefin copolymers therefrom.

JP 2004-083773A (2004-03-18) discloses the manufacture of vinyl-terminated copolymer made of propylene and alkenylaluminum and polar group-terminated copolymer.

JP 2003-246820A (2003-09-05) discloses propylene-alkenyldialkylaluminum copolymers and manufacture of stereoregular polar group-containing propylene copolymers.

Macromolecules (2002), 35(18), 6760-6762, discloses propene polymerization with stereospecific metallocene dichloride-$[Ph_3C][B(C_6F_5)_4]$ using alkenylaluminum as an alkylation reagent and as a functional comonomer.

Justus Liebigs Annalen der Chemie (1975), (4), 642-9 discloses thermal skeletal isomerization of the addition products of diisobutylhydroaluminum and 1,4-pentadienes.

Chemical Communications (London) (1968), (1), 7-9, discloses alkenylaluminum compounds prepared by treatment of iso-$Bu_2AlH$ with diolefins.

Other references of interest include: US 2003/104928; WO 2003/064433; U.S. Pat. No. 6,489,480; US 2002/038036; WO 2002/102811; U.S. Pat. Nos. 6,414,162; 6,040,261; 6,239,062; 6,376,629; 6,451,724; JP 2002-069116A; JP 2002-0253486A; US 2003/0027950A1; JP 2002-037812A; JP 2002-020415A; JP 2002-060411A; JP 2001-316415A; JP 2001-316414A; U.S. Pat. No. 6,531,552; JP 2001-200010A; JP 2001-163909A; JP 2001-163908A; WO 2001-30864A1; JP 2001-026613A; JP 2001-031720A; JP 2000-198812A; WO 2000/22010A1; JP 2000-072813A; WO 2000/11044A1; U.S. Pat. Nos. 6,353,063; 6,376,416; JP 11255816A (1999-09-21); JP 11-166012A (1999-06-22); JP 11-166011A (1999-06-22); U.S. Pat. No. 6,048,817; JP 05-025214A (1993-02-02); WO 2003/064433A1; WO 2003/0644435A1; JP 2004-83773; and WO 2007/035492.

Given the high cost, low stability and reduced activity of MAO-based metallocene polymerization systems, there is a need in the art for new inexpensive, stable and supportable polymerization catalyst activator compounds.

SUMMARY OF THE INVENTION

This invention relates to organoaluminum compounds useful as monomers, activators, or scavengers. This invention also relates to supported activators comprising the product of the combination of an organoaluminum activator compound and, optionally, an olefin polymerization catalyst, such as a metallocene catalyst compound. This invention further relates to catalyst systems comprising metallocene catalyst compounds and such activators, as well as processes to polymerize unsaturated monomers using the supported activators.

The organoaluminum compounds described herein and referred to as aluminum vinyl-transfer agents (AVTAs) are the reaction product(s) of alkyl dienes with aluminum reagent(s) selected from trialkyl aluminums, dialkylaluminumhydrides, alkylaluminumdihydrides, and/or aluminumtrihydride. The alkyl diene and the aluminum reagent are combined and heated to produce the organoaluminum compound(s), which is useful as monomer and/or scavenger when utilized with metallocene and other transition metal catalysts to prepare polymers, such as polyethylene, polypropylene, and copolymers of ethylene and/or propylene.

One embodiment provides catalyst systems comprising, optionally a transition metal catalyst complex and an aluminum vinyl-transfer agent (AVTA) represented by formula:

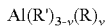

wherein: each R', independently, is a $C_1$-$C_{30}$ hydrocarbyl group; each R, independently, is a $C_4$-$C_{20}$ hydrocarbenyl group, having an end-vinyl group; and v is from 1.1 to less than 3.

DETAILED DESCRIPTION OF THE INVENTION

Figure 1:
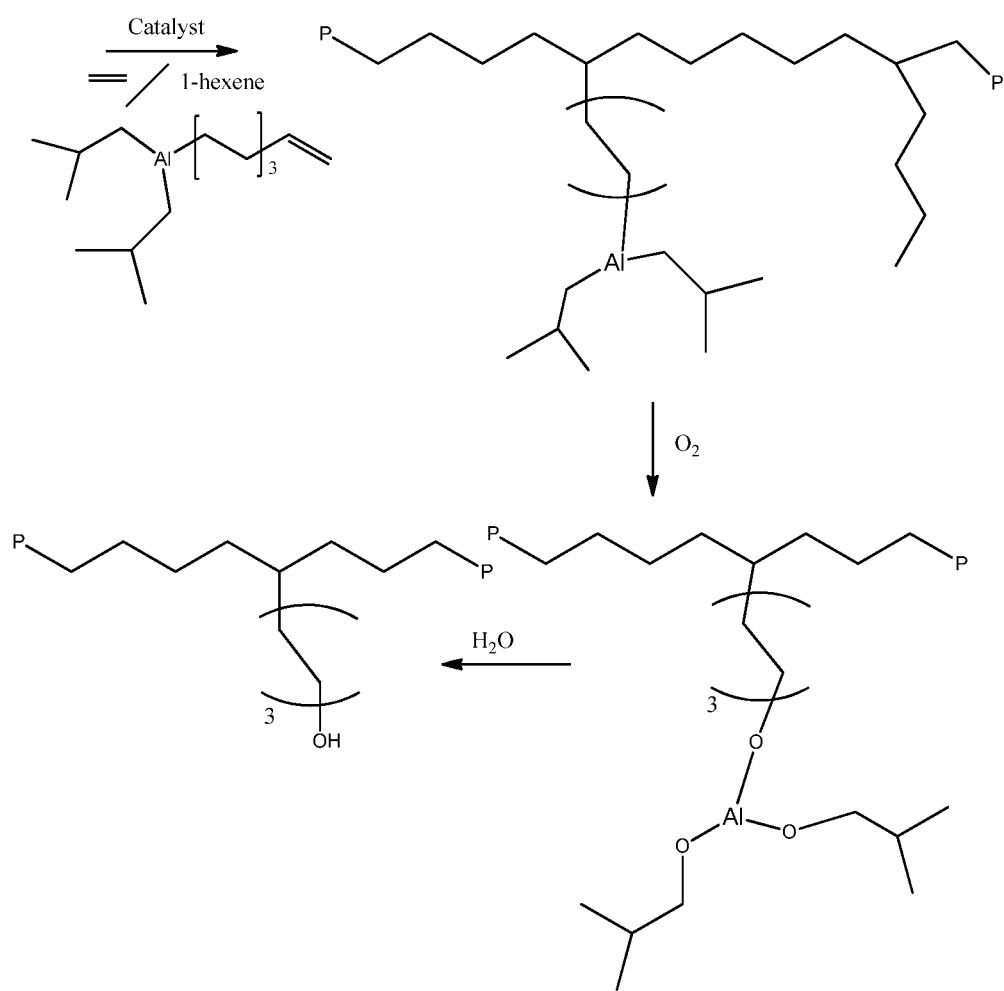
FIG. 1 is an illustration of Scheme I in Example 6.
Figure 2:
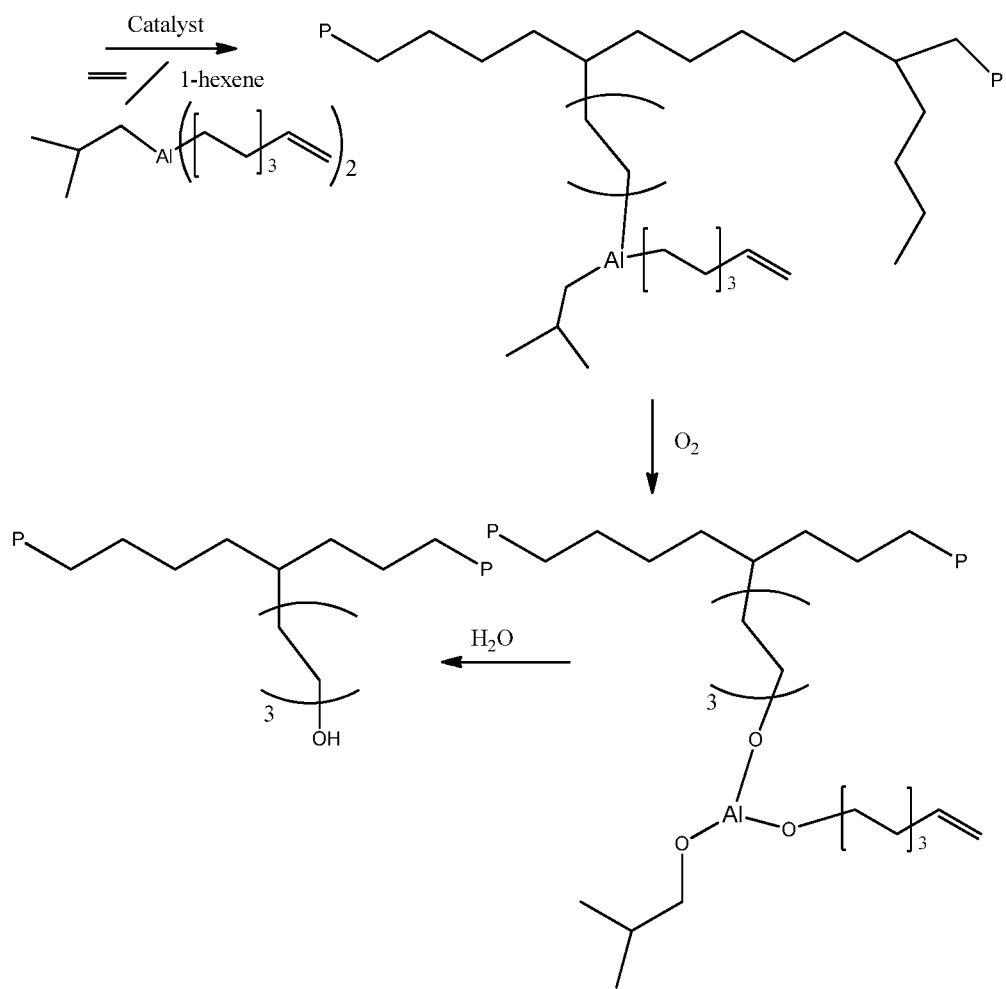
FIG. 2 is an illustration of Scheme II in Example 6.

This invention relates to supported activators (or scavengers) comprising the product of the combination of a support, an aluminum vinyl-transfer agents and, optionally, an olefin polymerization catalyst such as a metallocene catalyst.

In another embodiment, this invention relates to aluminum vinyl-transfer agents, and the process to produce them.

In still another embodiment, an aluminum vinyl-transfer agent and a metallocene catalyst are combined. The aluminum vinyl-transfer agent/metallocene mixture can, with or without being supported on a support such as a silicate, be used to polymerize olefins, in particular, alpha-olefins such as ethylene and or propylene. The aluminum vinyl-transfer agents can also act as a monomer in the polymerization and can be incorporated into the polymer. Subsequent reaction of the AVTA-copolymer with oxygen and water produces a polymer with hydroxyl functionality.

For the purposes of this patent specification and the claims thereto, the term "activator" is used interchangeably with the term "co-catalyst", the term "catalyst" refers to a metal compound that when combined with an activator polymerizes olefins, and the term "catalyst system" refers to the combination of a catalyst and an activator with or without a support. The terms "support" or "carrier", for purposes of this patent specification, are used interchangeably and are any known supports in the art such as silica.

As used herein, the new notation for the Periodic Table Groups is used as described in Chemical and Engineering News, 63(5), 27 (1985).

The term "substituted" means that a hydrogen group has been replaced with a hydrocarbyl group, a heteroatom, or a heteroatom containing group. For example, methyl cyclopentadiene (Cp) is a Cp group substituted with a methyl group and ethyl alcohol is an ethyl group substituted with an —OH group.

The terms "hydrocarbyl radical," "hydrocarbyl" and "hydrocarbyl group" are used interchangeably throughout this document. Likewise the terms "group", "radical", and "substituent" are also used interchangeably in this document. For purposes of this disclosure, "hydrocarbyl radical" is defined to be a radical, which contains hydrogen atoms and up to 50 carbon atoms and which may be linear, branched, or cyclic, and when cyclic, aromatic or non-aromatic.

Substituted hydrocarbyl radicals are radicals in which at least one hydrogen atom has been substituted with at least one functional group such as $NR^x_2$, $OR^x$, $SeR^x$, $TeR^x$, $PR^x_2$, $AsR^x_2$, $SbR^x_2$, $SR^x$, $BR^x$ and the like or where at least one non-hydrocarbon atom or group has been inserted within the hydrocarbyl radical, such as —O—, —S—, —Se—, —Te—, —N($R^x$)—, =N—, —P($R^x$)—, =P—, —As($R^x$)—, =As—, —Sb($R^x$)—, =Sb—, —B($R^x$)—, =B— and the like, where $R^x$ is independently a hydrocarbyl or halocarbyl radical, and two or more $R^x$ may join together to form a substituted or unsubstituted saturated, partially unsaturated or aromatic cyclic or polycyclic ring structure.

An alkyl diene is an alpha-omega diene of formula $H_2C=CH(CR^b_2)_pHC=CH_2$ where p is an integer from 0-16, and each $R^b$ is independently hydrogen or a $C_1$-$C_{10}$ alkyl. Preferably, each $R^b$ is hydrogen. Examples include 1,3-butadiene, 1,4-pentadiene, 1,5-hexadiene, 1,6-heptadiene, 1,7-octadiene and the like.

The term "hydrocarbeneyl" refers to a hydrocarb-di-yl divalent group, such as a $C_1$ to $C_{20}$ alkylene (i.e., methylene ($CH_2$), ethylene [$(CH_2)_2$], propandiyl [$(CH_2)_3$], butandiyl [$(CH_2)_4$], pentandiyl [$(CH_2)_5$], hexandiyl [$(CH_2)_6$], heptandiyl [$(CH_2)_7$], octandiyl [$(CH_2)_8$], nonandiyl [$(CH_2)_9$], decandiyl [$(CH_2)_{10}$], undecandiyl [$(CH_2)_{11}$], dodecandiyl [$(CH_2)_{12}$], and isomers thereof).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to, ethylene and or propylene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. An ethylene polymer is a polymer having at least 50 mol % of ethylene, a propylene polymer is a polymer having at least 50 mol % of propylene, and so on.

The following abbreviations may be used herein: Me is methyl, Et is ethyl, Pr is propyl, cPR is cyclopropyl, nPr is n-propyl, iPr is isopropyl, Bu is butyl, nBu is normal butyl, iBu is isobutyl, sBu is sec-butyl, tBu is tert-butyl, Oct is octyl, Ph is phenyl, Bz is benzyl, MAO is methylalumoxane, Ind is indenyl, Cp is cyclopentadienyl, Flu is fluorenyl, RT is room temperature (25° C., unless otherwise indicated).
Linear Mono-Olefins Any linear mono-olefin may be used for the polymerization reactions described herein. For example, an alpha olefin may be used. For the purposes of this invention and the claims thereto, the term "alpha olefin" refers to an olefin where the carbon-carbon double bond occurs between the alpha and beta carbons of the chain. Alpha olefins may be represented by the formula: $H_2C=CH—R^*$, wherein each $R^*$ is independently, hydrogen or a $C_1$ to $C_{30}$ hydrocarbyl; preferably, a $C_2$ to $C_{20}$ hydrocarbyl; preferably, a $C_3$ to $C_{12}$ hydrocarbyl; preferably, methyl, ethyl, propyl, butyl, pentyl, heptyl, octyl, nonyl, decyl, undecyl, dodecyl, and substituted analogs thereof. For example, 1-pentene, 1-hexene, 1-heptene, and 1-decene are alpha olefins that are particularly useful in embodiments herein.

The linear mono-olefin may also be substituted at any position along the carbon chain with one or more substituents. Suitable substituents include, without limitation, alkyl, preferably, $C_{1-6}$ alkyl; cycloalkyl, preferably, $C_{3-6}$ cycloalkyl; as well as hydroxy, ether, keto, aldehyde, and halogen functionalities.

Preferred linear mono-olefins include, ethylene, propylene, butene, pentene, hexene, octene, nonene, decene undecene, dodecene, and the isomers thereof (particularly the isomers where the double bond is in the alpha position (vinyl)).

Particularly preferred linear mono-olefins include 1-butene, 1-pentene, 1-hexene, 1-decene, and 1-octene.

Alkyl Aluminum Compounds

Alkyl aluminum compounds are represented by the formula:

$$AlR^a{}_3 \quad (I)$$

wherein each $R^a$ is independently, a hydrogen atom or a substituted or unsubstituted alkyl group and/or a substituted or unsubstituted aryl group. Optionally, one or more $R^a$ group can be a hydrogen atom. In one aspect, one or more IV group is an alkyl group containing 1 to 30 carbon atoms. Suitable IV groups include methyl, ethyl, propyl, butyl, isobutyl, pentyl, hexyl, heptyl, octyl, nonyl, decyl, undecyl, docecyl, aryl, and all isomers thereof. Trialkylaluminum compounds and dialkylaluminumhydride compounds are suitable examples. In some embodiments, the alkyl aluminum compound is referred to as an aluminum reagent.

Aluminum Vinyl Transfer Agents

The aluminum vinyl-transfer agent, also referred to as an AVTA, useful herein is any aluminum agent that contains at least one transferrable group that has an end-vinyl group also referred to as an allyl chain end. An allyl chain end is represented by the formula $H_2C=CH-CH_2-$. "Allylic vinyl group," "allyl chain end," "vinyl chain end," "vinyl termination," "allylic vinyl group," "terminal vinyl group," and "vinyl terminated" are used interchangeably herein and refer to an allyl chain end. An allyl chain end is not a vinylidene chain end or a vinylene chain end. The number of allyl chain ends, vinylidene chain ends, vinylene chain ends, and other unsaturated chain ends is determined using $^1H$ NMR at 120° C. using deuterated tetrachloroethane as the solvent on an at least 250 MHz NMR spectrometer.

Useful transferable groups containing an allyl chain end are represented by the formula $CH_2=CH-CH_2-R^{}$, where $R^{}$ represents a hydrocarbeneyl group or a substituted hydrocarbeneyl group, such as a $C_1$ to $C_{20}$ alkylene, preferably methylene ($CH_2$), ethylene [$(CH_2)_2$], propandiyl [$(CH_2)_3$], butandiyl [$(CH_2)_4$], pentandiyl [$(CH_2)_5$], hexandiyl [$(CH_2)_6$], heptandiyl [$(CH_2)_7$], octandiyl [$(CH_2)_8$], nonandiyl [$(CH_2)_9$], decandiyl [$(CH_2)_{10}$], undecandiyl [$(CH_2)_{11}$], dodecandiyl [$(CH_2)_{12}$], or an isomer thereof. Useful transferable groups are preferably non-substituted linear hydrocarbeneyl groups.

In an embodiment of the invention, the catalyst system described herein using the AVTA, the catalyst undergoes alkyl group transfer with the aluminum vinyl transfer agent, which enables the formation of polymer chains containing one or more allyl chain ends.

AVTA's are alkenylaluminum reagents capable of causing group exchange between the transition metal of the catalyst system ($M^{TM}$) and the metal of the AVTA ($M^{AVTA}$). Dependent on the catalyst system used, the reverse reaction may also occur such that the polymeryl chain is transferred back to the transition metal of the catalyst system.

This reaction scheme is illustrated below:

wherein $M^{TM}$ is an active transition metal catalyst site and P is the polymeryl chain, $M^{AVTA}$ is the metal of the AVTA, and R is a transferable group containing an allyl chain end, such as a hydrocarbyl group containing an allyl chain end, also called a hydrocarbenyl or alkenyl group.

In any embodiment of the invention described herein, the aluminum vinyl transfer agent is represented by the formula (II):

$$Al(R')_{3-v}(R)_v$$

where R is a hydrocarbenyl group containing 4 to 20 carbon atoms having an allyl chain end, R' is a hydrocarbyl group containing 1 to 30 carbon atoms, and v is 1.1 to less than 3 alternately v is 1.1 to 2.9, alternately 1.5 to 2.9, alternately 1.5 to 2.5, alternately 1.8 to 2.2. The compounds represented by the formula $Al(R')_{3-v}(R)_v$ are typically a neutral species, but anionic formulations may be envisioned, such as those represented by formula (III): $[Al(R')_{4-w}(R)_w]^-$, where w is 0.1 to 4, alternately 1.1 to 4, R is a hydrocarbenyl group containing 4 to 20 carbon atoms having an allyl chain end, and R' is a hydrocarbyl group containing 1 to 30 carbon atoms.

In any embodiment of any formula for an aluminum vinyl transfer agent described herein, each R' is independently chosen from $C_1$ to $C_{30}$ hydrocarbyl groups (such as a $C_1$ to $C_{20}$ alkyl groups, preferably methyl, ethyl, propyl, butyl, pentyl, hexyl, heptyl, octyl, nonyl, decyl, undecyl, dodecyl, or an isomer thereof), and R is represented by the formula:

$$-(CH_2)_nCH=CH_2$$

where n is an integer from 2 to 18, preferably between 6 to 18, preferably 6 to 12, preferably 6. In any embodiment of the invention described herein, particularly useful AVTAs include, but are not limited to, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-8-en-1-yl)aluminum, diisobutyl(dodec-10-en-1-yl)aluminum, and the like. Mixtures of one or more AVTAs may also be used. In some embodiments of the invention, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum are preferred.

Useful aluminum vinyl transfer agents include organoaluminum compound reaction products between an aluminum reagent ($AlR^a{}_3$) and an alkyl diene. Suitable alkyl dienes include those that have two "alpha olefins" at two termini of the carbon chain. The alkyl diene can be a straight chain or branched alkyl chain and substituted or unsubstituted. Exemplary alkyl dienes include but are not limited to, for example, 1,3-butadiene, 1,4-pentadiene, 1,5-hexadiene 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-eicosadiene, 1,20-heneicosadiene, etc. Exemplary aluminum reagents include triisobutylaluminum, diisobutylaluminumhydride, isobutylaluminumdihydride and aluminum hydride ($AlH_3$).

In any embodiment of the invention described herein, R is butenyl, pentenyl, heptenyl, or octenyl. In some embodiments, R is octenyl.

In any embodiment of the invention described herein, R' is methyl, ethyl, propyl, isobutyl, or butyl. In some embodiments, R' is isobutyl.

In any embodiment of the invention described herein, $R^a$ is methyl, ethyl, propyl, isobutyl, or butyl. In some embodiments, $R^a$ is isobutyl.

In any embodiment of the invention described herein, v is about 2, or v is 2.

In any embodiment of the invention described herein, v is an integer or a non-integer, preferably v is from 1.1 to 2.7, from about 1.5 to about 2.7, e.g., from about 1.6 to about 2.4, from about 1.7 to about 2.4, from about 1.8 to about 2.2, from about 1.9 to about 2.1 and all ranges there between.

In preferred embodiments of the invention described herein, R' is isobutyl and each R is octenyl, in particular, wherein v is from about v is from 1.1 to 2.7, from about 1.5 to about 2.7, e.g., from about 1.6 to about 2.4, from about 1.7 to about 2.4, from about 1.8 to about 2.2, from about 1.9 to about 2.1.

The amount of v (the aluminum alkenyl) is described using the formulas: $(3-v)+v=3$, and $Al(R')_{3-v}(R)_v$ where R is a hydrocarbenyl group containing 4 to 20 carbon atoms having an allyl chain end, R' is a hydrocarbyl group containing 1 to 30 carbon atoms, and v is 1.1 to less than 3. This formulation represents the observed average of organoaluminum species (as determined by $^1H$ NMR) present in a mixture, which may include any of $Al(R')_3$, $Al(R')_2(R)$, $Al(R')(R)_2$, and $Al(R)_3$. $^1H$ NMR spectroscopic studies are performed at room temperature using a Bruker 400 MHz NMR. Data is collected using samples prepared by dissolving 10-20 mg the compound in 1 mL of $C_6D_6$. Samples are then loaded into 5 mm NMR tubes for data collection. Data is recorded using a maximum pulse width of 45°, 8 seconds between pulses and signal averaging either 8 or 16 transients. The spectra are normalized to protonated tetrachloroethane in the $C_6D_6$. The chemical shifts (δ) are reported as relative to the residual protium in the deuterated solvent at 7.15 ppm.

Figure 4:
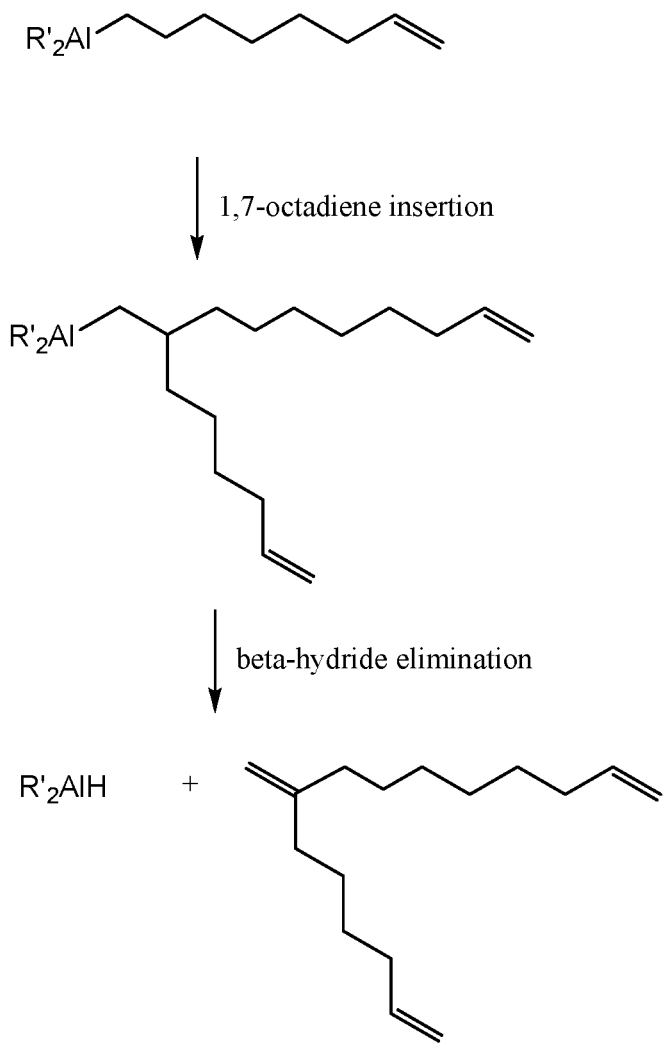
FIG. 4 is a scheme illustrating dimer formation.

In still another aspect, the aluminum vinyl-transfer agent has less than 50 wt % dimer present, based upon the weight of the AVTA, preferably less than 40 wt %, preferably less than 30 wt %, preferably less than 20 wt %, preferably less than 15 wt %, preferably less than 10 wt %, preferably less than 5 wt %, preferably less than 2 wt %, preferably less than 1 wt %, preferably 0 wt % dimer. Alternately dimer is present at from 0.1 to 50 wt %, alternately 1 to 20 wt %, alternately at from 2 to 10 wt %. Dimer is the dimeric product of the alkyl diene used in the preparation of the AVTA. The dimer can be formed under certain reaction conditions, and is formed from the insertion of a molecule of diene into the Al—R bond of the AVTA, followed by beta-hydride elimination. (See FIG. 4) For example, if the alkyl diene used is 1,7-octadiene, the dimer is 7-methylenepentadeca-1,14-diene. Similarly, if the alkyl diene is 1,9-decadiene, the dimer is 9-methylenenonadeca-1,18-diene.

Useful compounds can be prepared by combining an alkyl aluminum (aluminum reagent) having at least one secondary alkyl moiety such as triisobutylaluminum and/or at least one hydride, such as a dialkylaluminum hydride, a monoalkyl-aluminum dihydride or aluminum trihydride (aluminum hydride, $AlH_3$) with an alkyl diene and heating to a temperature that causes release of an alkylene byproduct. The use of solvent(s) is not required. However, non-polar solvents can be employed, such as, as hexane, pentane, toluene, benzene, xylenes, and the like, or combinations thereof.

In an embodiment of the invention, the AVTA is free of coordinating polar solvents such as tetrahydrofuran and diethylether.

The AVTA can be prepared from the reaction of an aluminum reagent and an alkyl diene. The reaction can take place in the absence of solvent (neat) or in the presence of a non-polar non-coordinating solvent such as a C5-C10 alkane, or an aromatic solvent such as benzene or toluene. Polar coordinating solvents such as tetrahydrofuran and diethylether should not be used since they coordinate to the aluminum of the AVTA, and make the AVTA less useful. The reaction preferably is heated from 60° C. to 110° C. Lower reaction temperatures from 60° C. to 80° C. are preferred if longer reaction times are used such as stirring with heat for 6-24 hours. Higher reaction temperatures from 90° C. to 110° C. are preferred if shorter reaction times are used such as stirring with heat for 1 to 2 hours. At a reaction temperature from 65° C. to 75° C., the reaction is preferably heated and stirred for 6-18 hours, preferably 8-12 hours. At a reaction temperature form 100° C. to 110° C., the reaction is preferably heated and stirred for 1 to 2 hours. Combinations of higher reaction temperature and lower reaction temperatures can be used, for example heating and stirring the reaction for 1 hour at 110° C. followed by heating and stirring at 65° C. to 75° C. for 8-12 hours. Lower reaction temperatures for longer times or higher reaction temperatures for shorter times favor formation of the AVTA with v=2, and disfavors formation of dimer. The AVTA with v=3 requires higher reaction temperatures and longer times, and always is accompanied with dimer formation.

After the reaction is complete, solvent, if present, can be removed and the product can be used directly without further purification.

The AVTA to catalyst complex equivalence ratio can be from about 1:100 to 500,000:1. Preferably the molar ratio of AVTA to catalyst complex is greater than one. More preferably, the molar ratio of AVTA to catalyst complex is greater than 5, alternately greater than 10, alternately greater than 15, alternately greater than 20, alternately greater than 25, alternately greater than 30.

The aluminum alkenyls can serve multiple functions during the polymerization. They can serve as a scavenger, become incorporated into the polymer which may be useful in gas phase reactors thereby avoiding undesirable build up of aluminum species on the reactor wall, and upon exposure of the polymer with the pendant aluminum groups, oxidation can be effected to provide aluminum alkoxides. The polymers can also be converted to include pendant OH functionality. Polymers may also be partially converted to include both pendant aluminum groups and pendant OH functionality. The materials produced herein can be used with fillers.

Olefin Polymerization Catalyst Compositions

The term "catalyst system" means a catalyst precursor/activator pair. When "catalyst system" is used to describe such a pair before activation, it means the unactivated catalyst (pre-catalyst) together with an activator and, optionally, a co-activator. When it is used to describe such a pair after activation, it means the activated catalyst and the activator or other charge-balancing moiety. The transition metal compound may be neutral as in a pre-catalyst, or a charged species with a counter ion as in an activated catalyst system. The term "catalyst system" can also include more than one catalyst precursor and/or more than one activator and optionally a co-activator. Likewise, the term "catalyst system" can also include more than one activated catalyst and one or more activator or other charge-balancing moiety, and optionally a co-activator.

Catalyst precursor is also often referred to as pre-catalyst, catalyst, catalyst compound, transition (or lanthanide or actinide) metal compound or transition (or lanthanide or actinide) metal complex. These words are used interchangeably. Activator and co-catalyst (or co-catalyst) are also used interchangeably. A scavenger is a compound that is typically added to facilitate polymerization by scavenging impurities. Some scavengers may also act as activators and may be referred to as co-activators. A co-activator that is not a scavenger may also be used in conjunction with an activator in order to form an active catalyst. In some embodiments, a co-activator can be pre-mixed with the transition metal compound to form an alkylated transition metal compound.

An activator or co-catalyst is a compound or mixture of compounds capable of activating a pre-catalyst to form an activated catalyst. The activator can be a neutral compound (also called a neutral activator) such as tris-perfluorphenyl boron or tris-perfluorophenyl aluminum, or an ionic compound (also called a discrete ionic activator) such as dimethylanilinium tetrakis-perfluorophenyl borate or triphenylcarbonium tetrakis-perfluoronaphthyl borate. Activators of these types are also commonly referred to as non-coordinating anion activators (NCA activators) owing to the commonly held belief by those skilled in the art, that the reaction of the activator with the pre-catalyst forms a cationic metal complex and an anionic non-coordinating or weekly coordinating anion (NCA). Activators of these types that are discrete characterizable compounds by definition exclude alumoxane co-catalysts which are mixtures. The use of the term NCA is used as an adjective to describe the type of activator as in an NCA activator, or is used as a noun to describe the non-coordinating or weakly coordinating anion which is derived from the NCA activator.

The processes described herein may use any catalyst system capable of polymerizing the monomers disclosed herein if that catalyst system is sufficiently active under the polymerization conditions disclosed herein. Thus, group 3-10 transition metal compounds or lanthanide metal compounds or actinide metal compounds may form suitable catalysts. A suitable olefin polymerization catalyst should be able to coordinate to, or otherwise associate with, an alkenyl unsaturation. Exemplary, but not limiting, catalysts include metallocene catalyst compounds.

Preferably, the catalyst is used in a cationic state and stabilized by a co-catalyst or activator. Especially preferred are group 4 metallocenes of (i.e., titanium, hafnium or zirconium) which typically exist during the polymerization in the $d^0$ mono-valent cationic state and bear one or two ancillary ligands. The important features of such catalysts for coordination polymerization is that the pre-catalyst comprises a ligand capable of abstraction and another ligand into which ethylene (or other olefin) can be inserted.

Representative metallocene-type compounds useful herein are represented by the formula:

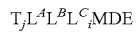

where, M is a group 3, 4, 5, or 6 transition metal atom, or a lanthanide metal atom, or actinide metal atom, preferably a group 4 transition metal atom selected from titanium, zirconium or hafnium; $L^A$, an ancillary ligand, is a substituted or unsubstituted monocyclic or polycyclic arenyl pi-bonded to M; $L^B$ is a member of the class of ancillary ligands defined for $L^A$, or is J, a hetero-atom ancillary ligand bonded to M through the heteroatom; the $L^A$ and $L^B$ ligands may be covalently bridged together through a bridging group, T, containing a group 14, 15 or 16 element or boron wherein j is 1 if T is present and j is 0 if T is absent (j equals 0 or 1); $L^C_i$ is an optional neutral, non-oxidizing ligand having a dative bond to M (i equals 0, 1, 2 or 3); and, D and E are independently mono-anionic labile ligands, each having a sigma-bond to M, optionally bridged to each other or to $L^A$, $L^B$ or $L^C$.

As used herein, the term "monocyclic arenyl ligand" is used herein to mean a substituted or unsubstituted monoanionic $C_5$ to $C_{100}$ hydrocarbyl ligand that contains an aromatic five-membered single hydrocarbyl ring structure (also referred to as a cyclopentadienyl ring).

As used herein, the term "polycyclic arenyl ligand" is used herein to mean a substituted or unsubstituted monoanionic $C_8$ to $C_{103}$ hydrocarbyl ligand that contains an aromatic five-membered hydrocarbyl ring (also referred to as a cyclopentadienyl ring) that is fused to one or two partially unsaturated, or aromatic hydrocarbyl or heteroatom substituted hydrocarbyl ring structures which may be fused to additional saturated, partially unsaturated, or aromatic hydrocarbyl or heteroatom substituted hydrocarbyl rings.

Cyclopentadienyl ligands, indenyl ligands fluorenyl ligands, tetrahydroindenyl ligands, cyclopenta[b]thienyl ligands, and cyclopenta[b]pyridyl ligands are all examples of arenyl ligands.

Non-limiting examples of $L^A$ include substituted or unsubstituted cyclopentadienyl ligands, indenyl ligands, fluorenyl ligands, dibenzo[b,h]fluorenyl ligands, benzo[b]fluorenyl ligands, azulenyl ligands, pentalenyl ligands, cyclopenta[b]naphthyl ligands, cyclopenta[a]naphthyl ligands, cyclopenta[b]thienyl ligands, cyclopenta[c]thienyl ligands, cyclopenta[b]pyrrolyl ligands, cyclopenta[c]pyrrolyl ligands, cyclopenta[b]furyl ligands, cyclopenta[c]furyl ligands, cyclopenta[b]phospholyl ligands, cyclopenta[c]phospholyl ligands, cyclopenta[b]pyridyl ligands, cyclopenta[c]pyridyl ligands, cyclopenta[c]phosphinyl ligands, cyclopenta[b]phosphinyl ligands, cyclopenta[g]quinolyl, cyclopenta[g]isoquinolyl, indeno[1,2-c]pyridyl, and the like, including hydrogenated versions thereof, for example tetrahydroindenyl ligands.

Non-limiting examples of $L^B$ include those listed for $L^A$ above. Additionally $L^B$ is defined as J, wherein J is represented by the formula J'-R''$_{k-l-j}$ and J' is bonded to M. J' is a heteroatom with a coordination number of three from group 15 or with a coordination number of two from group 16 of the Periodic Table of Elements, and is preferably nitrogen; R'' is selected from $C_1$-$C_{100}$ substituted or unsubstituted hydrocarbyl radical; k is the coordination number of the heteroatom J' where "k-l-j" indicates the number of R'' substituents bonded to J'. Non-limiting examples of J include all isomers (including cyclics) of propylamido, butylamido, pentylamido, hexylamido, heptylamido, octylamido, nonylamido, decylamido, undecylamido, docecylamido, phenylamido, tolylamido, xylylamido, benzylamido, biphenylamido, oxo, sulfandiyl, hexylphosphido and the like.

When present, T is a bridging group containing boron or a group 14, 15 or 16 element. Examples of suitable bridging groups include R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'$_2$CSiR'$_2$, R'$_2$SiSiR'$_2$, R'$_2$CSiR'$_2$CR'$_2$, R'$_2$SiCR'$_2$SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'B, R'$_2$C—

BR', R'$_2$C—BR'—CR'$_2$, R'$_2$C—O—CR'$_2$, R'$_2$C—S—CR'$_2$, R'$_2$C—Se—CR'$_2$, R'$_2$C—NR'—CR'$_2$, and R'$_2$C—PR'—CR'$_2$ where R' is hydrogen or a C$_1$-C$_{20}$ containing hydrocarbyl or substituted hydrocarbyl and optionally two or more adjacent R' may join to form a substituted or unsubstituted, saturated, partially unsaturated or aromatic, cyclic or polycyclic substituent.

Non-limiting examples of the bridging group T include CH$_2$, CH$_2$CH$_2$, CMe$_2$, SiMe$_2$, SiEt$_2$, SiPh$_2$, SiMePh, Si(CH$_2$)$_3$, Si(CH$_2$)$_4$, Si(CH$_2$)$_5$, Si(Ph-p-SiEt$_3$)$_2$, and the like.

Non-limiting examples of D and E are independently, fluoro, chloro, bromo, iodo, methyl, ethyl, benzyl, dimethylamido, methoxy, and the like.

More preferred are metallocenes which are bis-cyclopentadienyl derivatives of a group 4 transition metal, preferably zirconium or hafnium. See WO 99/41294. These may advantageously be derivatives containing a fluorenyl ligand and a cyclopentadienyl ligand connected by a single carbon and silicon atom. See WO 99/45040 and WO 99/45041. Most preferably, the Cp ring is unsubstituted and/or the bridge contains alkyl substituents, suitably alkylsilyl substituents to assist in the alkane solubility of the metallocene. See WO 00/24792 and WO 00/24793. Other possible metallocenes include those in WO 01/58912. Other suitable metallocenes may be bis-fluorenyl derivatives or unbridged indenyl derivatives which may be substituted at one or more positions on the fused ruing with moieties which have the effect of increasing the molecular weight and so indirectly permit polymerization at higher temperatures, such as described in EP 693 506 and EP 780 395.

Catalyst compounds that are particularly useful in this invention include one or more of the metallocene compounds listed and described in Paragraphs [0089]-[0162] of US 2015/0025209 A1, which was previously incorporated by reference herein. For instance, useful catalyst compounds may include any one or more of: cyclotetramethylenesilylene-bis(2,4,7-trimethylinden-1-yl)hafnium dimethyl, cyclopentamethylenesilylene-bis(2,4,7-trimethylinden-1-yl) hafnium dimethyl, cyclotrimethylenesilylene-bis(2,4,7-trimethylinden-1-yl)hafnium dimethyl, cyclotetramethylenesilylene-bis(2,4-dimethylinden-1-yl)hafnium dimethyl, cyclopentamethylenesilylene-bis(2,4-dimethylinden-1-yl) hafnium dimethyl, cyclotrimethylenesilylene-bis(2,4-dimethylinden-1-yl)hafnium dimethyl, cyclotetramethylenesilylene-bis(4,7-dimethylinden-1-yl)hafnium dimethyl, cyclopentamethylenesilylene-bis(4,7-dimethylinden-1-yl) hafnium dimethyl, cyclotrimethylenesilylene-bis(4,7-dimethylinden-1-yl)hafnium dimethyl, cyclotetramethylenesilylene-bis(2-methyl-4-cyclopropylinden-1-yl)hafnium dimethyl, cyclopentamethylenesilylene-bis(2-methyl-4-cyclopropylinden-1-yl)hafnium dimethyl, cyclotrimethylenesilylene-bis(2-methyl-4-cyclopropylinden-1-yl)hafnium dimethyl, cyclotetramethylenesilylene-bis(2-ethyl-4-cyclopropylinden-1-yl)hafnium dimethyl, cyclopentamethylenesilylene-bis(2-ethyl-4-cyclopropylinden-1-yl)hafnium dimethyl, cyclotrimethylenesilylene-bis(2-ethyl-4-cyclopropylinden-1-yl)hafnium dimethyl, cyclotetramethylenesilylene-bis(2-methyl-4-t-butylinden-1-yl)hafnium dimethyl, cyclopentamethylenesilylene-bis(2-methyl-4-t-butylinden-1-yl)hafnium dimethyl, cyclotrimethylenesilylene-bis(2-methyl-4-t-butylinden-1-yl)hafnium dimethyl, cyclotetramethylenesilylene-bis(4,7-diethylinden-1-yl)hafnium dimethyl, cyclopentamethylenesilylene-bis(4,7-diethylinden-1-yl)hafnium dimethyl, cyclotrimethylenesilylene-bis(4,7-diethylinden-1-yl)hafnium dimethyl, cyclotetramethylenesilylene-bis(2,4-diethylinden-1-yl)hafnium dimethyl, cyclopentamethylenesilylene-bis(2,4-diethylinden-1-yl)hafnium dimethyl, cyclotrimethylenesilylene-bis(2,4-diethylinden-1-yl)hafnium dimethyl, cyclotetramethylenesilylene-bis(2-methyl-4,7-diethylinden-1-yl)hafnium dimethyl, cyclopentamethylenesilylene-bis(2-methyl-4,7-diethylinden-1-yl)hafnium dimethyl, cyclotrimethylenesilylene-bis(2-methyl-4,7-diethylinden-1-yl)hafnium dimethyl, cyclotetramethylenesilylene-bis(2-ethyl-4-methylinden-1-yl) hafnium dimethyl, cyclopentamethylenesilylene-bis(2-ethyl-4-methylinden-1-yl)hafnium dimethyl, cyclotrimethylenesilylene-bis(2-ethyl-4-methylinden-1-yl) hafnium dimethyl, cyclotetramethylenesilylene-bis(2-methyl-4-isopropylinden-1-yl)hafnium dimethyl, cyclopentamethylenesilylene-bis(2-methyl-4-isopropylinden-1-yl) hafnium dimethyl, cyclotrimethylenesilylene-bis(2-methyl-4-isopropylinden-1-yl)hafnium dimethyl.

Likewise, the catalyst compounds described herein may be synthesized in any suitable manner, including in accordance with procedures described in Paragraphs [0096] and [00247]-[00298] of U.S. Ser. No. 14/325,449, filed Jul. 8, 2014 and published as US 20150025209 A1.

Additional useful catalyst compounds may include any one or more of: rac-dimethylsilyl-bis(2-methyl-4-phenylindenyl)hafniumdimethyl, rac-dimethylsilyl-bis(2-methyl-4-phenyl-indenyl) hafniumdichloride, rac-dimethylsilyl-bis (2-methyl-4-phenyl-indenyl) zirconiumdimethyl, rac-dimethylsilyl-bis(2-methyl-4-phenyl-indenyl) zirconiumdichloride, rac-dimethylsilyl-bis(2-methyl-benzindenyl)hafniumdimethyl, rac-dimethylsilyl-bis(2-methyl-benzindenyl) hafniumdichloride, rac-dimethylsilyl-bis(2-methyl-benzindenyl) zirconiumdimethyl, rac-dimethylsilyl-bis(2-methyl-benzindenyl) zirconiumdichloride, rac-dimethylsilylbis[(2-methyl-4-phenyl)indenyl] zirconiumdimethyl, rac-dimethylsilylbis[(2-methyl)indenyl] zirconiumdimethyl, rac-dimethylsilyl-bis(indenyl)hafniumdimethyl, rac-dimethylsilyl-bis(indenyl)hafniumdichloride, rac-dimethylsilyl-bis(indenyl)zirconiumdimethyl, rac-dimethylsilyl-bis(indenyl)zirconiumdichloride, bis(1-methyl,4-butylcyclopentadienyl)zirconiumdichloride, bis(1-methyl,4-butylcyclopentadienyl)zirconiumdimethyl, bis(1-methyl,4-butylcyclopentadienyl)zirconiumdimethoxide, bis(1-methyl,4-butylcyclopentadienyl)zirconiumdibenzyl, bis(1-methyl,4-butylcyclopentadienyl)zirconiumdifluoride, bis(1-methyl,4-butylcyclopentadienyl)zirconiumdiamide, bis(1-methyl,4-ethylcyclopentadienyl)zirconiumdichloride, bis(1-methyl,4-ethylcyclopentadienyl)zirconiumdimethyl, bis(1-methyl,4-benzylcyclopentadienyl)zirconiumdichloride, bis (1-methyl,4-benzylcyclopentadienyl)zirconiumdimethyl, bis(1-methyl,3-butylcyclopentadienyl)zirconiumdichloride, bis(1-methyl,3-butylcyclopentadienyl)zirconiumdimethyl, bis(1-methyl,3-n-propylcyclopentadienyl)zirconiumdichloride, and/or bis(1-methyl,3-n-propylcyclopentadienyl)zirconiumdimethyl.

Suitable mono-Cp amido group 4 complexes useful herein include: dimethylsilylene(tetramethylcyclopentadienyl)(cyclododecylamido)titanium dimethyl; dimethylsilylene(tetramethylcyclopentadienyl)(tert-butylamido)titanium dimethyl; dimethylsilylene(tetramethylcyclopentadienyl) (adamantylamido)titanium dimethyl; dimethylsilylene (tetramethylcyclopentadienyl)(cyclooctylamido)titanium dimethyl; dimethylsilylene(tetramethylcyclopentadienyl) (cyclohexylamido)titanium dimethyl; dimethylsilylene(tetramethylcyclopentadienyl)(norbornylamido)titanium dimethyl; dimethylsilylene(trimethylcyclopentadienyl) (cyclododecylamido)titanium dimethyl; dimethylsilylene (trimethylcyclopentadienyl)(adamantylamido)titanium dimethyl; dimethylsilylene(trimethylcyclopentadienyl)(tert-butylamido)titanium dimethyl; dimethylsilylene(6-methyl- 1,2,3,5-tetrahydro-s-indacen-5-yl)(tert-butylamido)titanium dimethyl; dimethylsilylene(6-methyl-1,2,3,5-tetrahydro-s-indacen-5-yl)(adamantylamido)titanium dimethyl; dimethylsilylene(6-methyl-1,2-tetrahydro-s-indacen-5-yl) (cyclooctylamido) titanium dimethyl; dimethyl silylene(6-methyl-1,2,3,5-tetrahydro-s-indacen-5-yl) (cyclohexylamido)titanium dimethyl; dimethylsilylene(6-methyl-1,2,3,5-tetrahydro-s-indacen-5-yl) (cyclododecylamido)titanium dimethyl; dimethylsilylene(2,2,6-trimethyl-1,2,3,5-tetrahydro-s-indacen-5yl) (adamantylamido)titanium dimethyl; dimethylsilylene(2,2,6-trimethyl-1,2-tetrahydro-s-indacen-5-yl) (cyclohexylamido)titanium dimethyl; dimethylsilylene(2,2,6-trimethyl-1,2,3,5-tetrahydro-s-indacen-5-yl) (cyclododecylamido)titanium dimethyl; dimethylsilylene(2,2,6-trimethyl-1,2,3,5-tetrahydro-s-indacen-5-yl)(tert-butylamido)titanium dimethyl, and any combination thereof.

Particularly useful fluorenyl-cyclopentadienyl group 4 complexes include: 1,1'-bis(4-triethylsilylphenyl)methylene-(cyclopentadienyl)(2,7-di-tert-butyl-fluoren-9-yl)hafnium dimethyl; dimethylsilylene(cyclopentadienyl)(2,7-di-tert-butyl-fluoren-9-yl)hafnium dimethyl; dimethylsilylene (cyclopentadienyl)(3,6-di-tert-butyl-fluoren-9-yl)hafnium dimethyl; diphenylmethylene(cyclopentadienyl)(2,7-di-tert-butyl-fluoren-9-yl)hafnium dimethyl; diphenylmethylene (cyclopentadienyl)(3,6-di-tert-butyl-fluoren-9-yl)hafnium dimethyl; isopropylidene(cyclopentadienyl)(2,7-di-tert-butyl-fluoren-9-yl)hafnium dimethyl; isopropylidene(cyclopentadienyl)(3,6-di-tert-butyl-fluoren-9-yl)hafnium dimethyl; dimethylsilylene(cyclopentadienyl)(2,7-dimethylfluoren-9-yl)hafnium dimethyl; dimethylsilylene (cyclopentadienyl)(3,6-dimethylfluoren-9-yl)hafnium dimethyl; diphenylmethylene(cyclopentadienyl)(2,7-dimethylfluoren-9-yl)hafnium dimethyl; diphenylmethylene(cyclopentadienyl)(3,6-dimethylfluoren-9-yl)hafnium dimethyl; dimethylsilylene(cyclopentadienyl)(fluoren-9-yl) hafnium dimethyl; isopropylidene(cyclopentadienyl) (fluoren-9-yl)hafnium dimethyl; diphenylmethylene (cyclopentadienyl)(fluoren-9-yl)hafnium dimethyl, and 1,1'-bis(4-triethylsilylphenyl)methylene(cyclopentadienyl)(2,7-di-tert-butyl-fluoren-9-yl)hafnium dimethyl.

As noted previously, the catalyst system further comprises an activator, as well as optional support and co-activator(s). Suitable activators, optional supports, and optional co-activator(s) are discussed in greater detail below.

Catalyst System Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Particular activators include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

In one embodiment, alumoxane activators are utilized as an activator in the catalyst composition. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). In one aspect, an alkylalumoxane is not required in the catalyst system.

When the activator is an alumoxane (modified or unmodified), some embodiments select the maximum amount of activator at a 5000-fold molar excess Al/M over the catalyst compound (per metal catalytic site). The minimum activator-to-catalyst-compound is a 1:1 molar ratio. Other ranges may include from 1:1 to 1000:1, such as 1:1 to 500:1. For instance, activator may be employed at any one of about 500, 450, 400, 350, 300, 250, 200, 150, 100, 50, 25, and 1 mole(s) or less, per mole catalyst compound.

In an alternate embodiment, little or no alumoxane is used in the polymerization processes described herein. In particular, alumoxane may be present at zero mole %.

In addition or instead, catalyst systems of this invention can include at least one non-coordinating anion (NCA) activator, as defined previously. Non-coordinating anions useful in accordance with this invention are those that are compatible, stabilize the transition metal cation in the sense of balancing its ionic charge at +1, and yet retain sufficient lability to permit displacement during polymerization.

In a preferred embodiment boron containing NCA activators represented by the formula below can be used:

$$Z_d^+(A^{d-})$$

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. In particular embodiments, $Z_d^+$ is triphenyl carbonium. Preferred reducible Lewis acids can be any triaryl carbonium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted C1 to C40 hydrocarbyl), preferably the reducible Lewis acids in formula (14) above as "Z" include those represented by the formula: ($Ph_3C$), where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation (L-H)$_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k}+Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst are the compounds described as (and particularly those specifically listed as) activators in U.S. Pat. No. 8,658,556, which is incorporated by reference herein.

Most preferably, the ionic stoichiometric activator $Z_d^+$ ($A^{d-}$) is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3, 5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

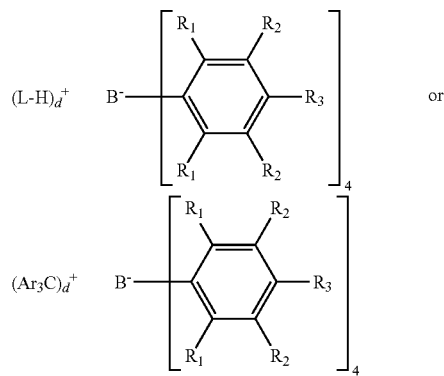

where: each $R_1$ is, independently, a halide, preferably a fluoride; Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics; each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring); and L is an neutral Lewis base; (L-H)$^+$ is a Bronsted acid; d is 1, 2, or 3; wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

TABLE 1

| Relative Volumes | |
| --- | --- |
| Element | Relative Volume |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of particularly useful Bulky activators, please see U.S. Pat. No. 8,658,556, which is incorporated by reference herein. Particular examples of suitable NCA activators include: N,N-dimethylaninlium tetrakis(pentafluorophenyl)borate; N,N-dimethylanilinium tetrakis(perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3, 5-bis(trifluoromethyl)phenyl)borate, triphenylcarbenium tetrakis(perfluorophenyl)borate, [Ph$_3$C$^+$][B(C$_6$F$_5$)$_4^-$], [Me$_3$NH$^+$][(C$_6$F$_5$)$_4^-$]; 1-(4-(tris(pentafluorophenyl)borate)-2,3,5,6-tetrafluorophenyl]pyrrolidinium; tetrakis(pentafluoro-phenyl)borate, 4-(tris(pentafluorophenyl)borate)-2,3,5,6-tetrafluoro-pyridine, bis($C_4$-$C_{20}$alkyl) nethylammonium tetrakis(pentafluorophenyl)borate and bis(hydrogenated tallowalkyl)methylammonium tetrakis(pentafluorophenyl)borate.

In another embodiment, one or more of the NCAs is chosen from the activators described in U.S. Pat. No. 6,211,105.

Any of the activators described herein may optionally be mixed together before or after combination with the catalyst compound, preferably before being mixed with one or more catalyst compounds.

In some embodiments, the same activator or mix of activators may be used for combinations of catalyst compounds. In other embodiments, however, different activators or mixtures of activators may be used for each catalyst compounds. For example, in one embodiment: (i) an activator such as N,N-dimethylanilinium tetrakis(perfluoronaphthyl)borate may be used to activate a catalyst compound (in other words, the catalyst system may comprise a catalyst compound and N,N-dimethylanilinium tetrakis(perfluoronaphthyl)borate; and (ii) an activator such as N,N-dimethylanilinium tetrakis(pentafluorophenyl)borate may be used to activate a catalyst compound (that is, the catalyst system may comprise a catalyst compound and N,N-dimethylanilinium tetrakis(pentafluorophenyl)borate).

Further, the typical activator-to-catalyst ratio for each of the catalysts (e.g., all activators-to-catalyst or all activators-to-catalysts ratio) is a 1:1 molar ratio. Alternate preferred ranges include from 0.1:1 to 100:1. For instance, activator-to-catalyst ratio may be any one of about 0.5, 1, 2, 5, 10, 50, 75, 100, 200, 250, 300, 350, 400, 450, 500, 600, 700, 800, 900, and 1000 to 1. According to some embodiments, activator-to-catalyst ratio may be within a range between any two of the foregoing.

In some embodiments, the activator(s) is/are contacted with a catalyst compound to form the catalyst system comprising activated catalyst and activator or other charge-balancing moiety, before the catalyst system is contacted with one or more monomers. In other embodiments, the activator(s) may be co-fed to catalyst compound(s) together with one or more monomers. In embodiments wherein two or more catalyst systems are utilized in one polymerization zone (e.g., in a process using a multiple catalyst system as described in more detail below, such as a dual catalyst system), each of the catalyst compounds may be contacted with their respective activator(s) (which, again, may be the same or different) before being mixed together. Where the same activator is used for each, a mixture of catalysts may be contacted with activator (either before or along with feeding of monomers to the catalyst mixture).

This invention relates to catalyst systems comprising alkyl aluminum (AVTA) treated supports. The support can be silica. Further, the catalyst system can include one or more catalysts described herein.

Olefin Polymerization Catalyst System

In the present invention, an olefin polymerization catalyst system can be prepared by contacting the organoaluminum compounds (e.g., the AVTA compounds) described herein with a catalyst compound (also called catalyst precursor compounds, pre-catalyst compounds or catalyst precursors). In one embodiment, a supported catalyst system may be prepared, generally, by the reaction of the organoaluminum compound with the addition of a metallocene catalyst, followed by addition of a support. Alternately a supported catalyst system may be prepared, generally, by the reaction of the organoaluminum compound, a support such as silica, and then adding one or more metallocene catalysts.

In a preferred embodiment the support is combined with the organoaluminum and thereafter is combined with the catalyst.

Support Materials

In embodiments herein, the catalyst system may comprise an inert support material. Preferably the supported material is a porous support material, for example, talc, and inorganic oxides. Other support materials include zeolites, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia, and the like. Other suitable support materials, however, can be employed, for example, finely divided functionalized polyolefins, such as finely divided polyethylene. Particularly useful supports include magnesia, titania, zirconia, phyllosilicate, zeolites, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 µm. More preferably, the surface area of the support material is in the range of from about 50 to about 500 $m^2/g$, pore volume of from about 0.5 to about 3.5 cc/g and average particle size of from about 10 to about 200 µm. Most preferably the surface area of the support material is in the range is from about 100 to about 400 $m^2/g$, pore volume from about 0.8 to about 3.0 cc/g and average particle size is from about 5 to about 100 µm. The average pore size of the support material useful in the invention is in the range of from 10 to 1000 Å, preferably 50 to about 500 Å, and most preferably 75 to about 350 Å. In some embodiments, the support material is a high surface area, amorphous silica (surface area=300 $m^2/gm$; pore volume of 1.65 $cm^3/gm$). Preferred silicas are marketed under the tradenames of DAVISON 952 or DAVISON 955 by the Davison Chemical Division of W.R. Grace and Company. In other embodiments DAVISON 948 is used.

The support material should be dry, that is, free of absorbed water. Drying of the support material can be effected by heating or calcining at about 100° C. to about 1000° C., preferably at least about 600° C. When the support material is silica, it is heated to at least 200° C., preferably about 200° C. to about 850° C., and most preferably at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this invention. The calcined support material is then contacted with at least one polymerization catalyst comprising at least one metallocene compound and an activator.

The support material, having reactive surface groups, typically hydroxyl groups, is slurried in a non-polar solvent and the resulting slurry is contacted with a solution of a metallocene compound, an organoaluminum compound (AVTA) and, optionally, an activator. In some embodiments, the slurry of the support material is first contacted with the activator for a period of time in the range of from about 0.5 hours to about 24 hours, from about 2 hours to about 16 hours, or from about 4 hours to about 8 hours. The solution of the metallocene compound is then contacted with the isolated support/activator. In some embodiments, the supported catalyst system is generated in situ. In an alternate embodiment, the slurry of the support material is first contacted with the catalyst compound for a period of time in the range of from about 0.5 hours to about 24 hours, from about 2 hours to about 16 hours, or from about 4 hours to about 8 hours. The slurry of the supported metallocene compound is then contacted with the activator solution.

The mixture of the metallocene, organoaluminum compound, activator and support is heated to about 0° C. to about 70° C., preferably to about 23° C. to about 60° C., preferably at room temperature. Contact times typically range from about 0.5 hours to about 24 hours, from about 2 hours to about 16 hours, or from about 4 hours to about 8 hours.

Suitable non-polar solvents are materials in which all of the reactants used herein, i.e., the activator, and the metallocene compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Process and Olefin Monomers

The organoaluminum compounds of the invention and catalyst systems utilizing the organoaluminum compounds described above are suitable for use in any prepolymerization and/or polymerization process over a wide range of temperatures and pressures. The temperatures may be in the range of from 60° C. to about 280° C., preferably from 50° C. to about 200° C. In another embodiment the polymerization temperature is above 0° C., above 50° C., above 80° C., above 100° C., above 150° C. or above 200° C. In an embodiment, the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefin(s) at least one of which is ethylene or propylene.

In one embodiment, the process of the invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In another embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In another embodiment of the invention, the AVTA acts as a monomer and can be inserted within the growing polymer chain. The AVTA monomer is copolymerized with one or more of ethylene, propylene, and other alpha-olefin having from 4 to 12 carbon atoms. The AVTA monomer is represented by the following formula:

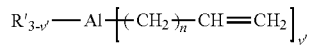

$$R'_{3-v'}-Al-(CH_2)_{\overline{n}}-CH=CH_2]_{v'}$$

Wherein R', is as previously defined, v' is an integer or non-integer from 1 to 3, preferably 1.1-2.9, and n is an integer from 2 to 18, preferably 3, 4, or 6, preferably 6. In some embodiments, v' is from about 1.5 to about 2.7, e.g., from about 1.6 to about 2.4, from about 1.7 to about 2.4, from about 1.8 to about 2.2, from about 1.9 to about 2.1 and all ranges there between.

In one embodiment, the invention is directed to polymerization process, particularly a gas phase or slurry phase process, for polymerizing propylene alone or with one or more other monomers including ethylene, and/or other olefins having from 4 to 12 carbon atoms.

In embodiments of the process of this invention, the catalyst system may be employed in liquid phase (solution, slurry, suspension, bulk phase or combinations thereof), in high pressure liquid, or supercritical fluid or gas phase processes. Each of these processes may be employed in single, parallel or series reactors. The liquid processes comprise contacting the ethylene and/or α-olefin and at least one vicinally disubstituted olefin monomer with the catalyst system described herein in a suitable diluent or solvent and allowing the monomers to react for a sufficient time to produce embodiments of the invention copolymers. One or more of the monomers used in the polymerization may be utilized as a solvent and/or diluent, generally in homogeneous polymerizations in the liquid monomer or monomers. Hydrocarbyl solvents are also suitable, both aliphatic and aromatic, including hexane and toluene. Bulk and slurry processes may typically be accomplished by contacting the catalysts with a slurry of liquid monomer, the catalyst system being supported. Gas phase processes may use the supported catalyst and may be conducted in any manner known to be suitable for producing ethylene homopolymers or copolymers via coordination polymerization. Illustrative examples may be found in U.S. Pat. Nos. 4,543,399; 4,588,790; 5,028,670; 5,382,638; 5,352,749; 5,436,304; 5,453,471; 5,463,999; and WO 95/07942. Each is incorporated by reference for purposes of U.S. patent practice.

Generally, the polymerization reaction temperature may vary from −50° C. to 250° C. The reaction temperature conditions may be from −20° C. to 220°, or below 200° C. The pressure may vary from 1 mm Hg to 2500 bar, or from 0.1 bar to 1600 bar, or from 1.0 to 500 bar. Where lower molecular weight copolymers, e.g., $M_n \le 10,000$, are sought, it may be suitable to conduct the reaction processes at temperatures above 0° C. and pressures under 500 bar.

Polymer Products

The polymers produced by the process of the invention can be used in a wide variety of products and end-use applications. The polymers produced can be homo- and copolymers of ethylene and propylene and include linear low density polyethylene, elastomers, plastomers, high-density polyethylenes, medium density polyethylenes, low density polyethylenes, polypropylene and polypropylene copolymers. Polymers, typically ethylene based copolymers, have a density of from 0.86 g/cc to 0.97 g/cc; density being measured in accordance with ASTM-D-1238. Propylene based polymers produced include isotactic polypropylene, atactic polypropylene and random, block or impact copolymers.

In embodiments of the invention, when the AVTA is used as a monomer, the AVTA-polymer produced herein is represented by the formula: Polymer-$(CH_2)_n$—Al—$(R')_{3-v'}(R)_{v'-1}$, wherein Polymer is a polymer from the polymerization of olefinic monomers; R, R', v' and n are as previously defined (preferably n is an integer from 2 to 18, each R is an alkyl or an alkenyl group, v' is an integer or non-integer from 1 to 3, each R', independently, is a $C_1$-$C_{30}$ hydrocarbyl group). AVTA-Polymer is a polymer from the polymerization of olefinic monomers (such as ethylene, propylene, etc.) and the AVTA. One or more aluminum functionalities can be located anywhere along the AVTA-polymer chain.

In embodiments of the invention, when the AVTA is used as a monomer, the AVTA-polymer produced herein can be oxidized or partially oxidized using oxygen and is represented by the formula: Polymer-$(CH_2)_n$—$O_x$Al—$(O_xR')_{3-v'}(O_xR)_{v'-1}$, wherein R, R', v' and n are as previously defined (preferably n is an integer from 2 to 18, each R is an alkyl or an alkenyl group, v' is an integer or non-integer from 1 to 3, each R', independently, is a $C_1$-$C_{30}$ hydrocarbyl group), each x is independently zero or one, O is oxygen, and is present when x is 1 and absent when x is zero, and provided that at least one x is 1. As with the AVTA-polymer, one or more aluminum functionalities can be located anywhere along the oxidized or partially oxidized AVTA-polymer chain.

In embodiments of the invention, the AVTA-polymer can be fully hydrolyzed or partially hydrolyzed to include hydroxyl functionality into the polymer. This is typically done by first oxidizing the polymer as described above, and then reacting the polymer with water. Fully hydrolyzed AVTA-polymers can be represented by the formula Polymer-$(CH_2)_n$—OH where n is as previously defined and wherein the hydroxyl functionality can be located anywhere along the polymer chain. Partially hydrolyzed AVTA-polymers can be represented by the formula HO—$(CH_2)_n$-Polymer-$(CH_2)_n$—$O_x$AL-$(O_xR')_{3-v'}(O_xR)_{v'-1}$ wherein R, R', v' and n are as previously defined and x' is zero or one, O is oxygen, and is present when x' is 1 and absent when x' is zero, and the aluminum and hydroxyl functionalities can be located anywhere along the polymer chain.

In an embodiment, the Polymer is polyethylene (preferably a homopolymer or copolymer of ethylene, having from 0 to up to 50 mole % (alternately from 2 to 30 mole %, alternately from 4 to 20 mole %) of C3 to C40 olefin monomer, such as propylene, butene, hexene and or octene).

The AVTA-polymers, fully or partially oxidized AVTA-polymers and fully or partially hydrolyzed AVTA-polymers (also referred to as polymers, copolymers and homopolymers) of embodiments of the invention may have an Mn (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000. Additionally, copolymers of embodiments of the invention will comprise a molecular weight distribution (Mw/Mn) in the range of 1, or 1.5 or 6, or 4 or 3, preferably from greater than 1 to 40, alternatively from 1.5 to 20, alternatively from 1.5 to 10, alternatively from 1.6 to 6, alternatively from 1.5 to 4, or alternatively from 2 to 3.

The amount of AVTA functionality in the polymer is from 0.01 wt % to 10 wt % based on AVTA monomer molecular weight, alternatively 0.1 to 10 wt %, alternatively 0.1 to 5 wt %, alternatively 0.1 to 1 wt %.

The amount of oxidized or partially oxidized AVTA functionality in the polymer is from 0.01 wt % to 10 wt % based on AVTA monomer molecular weight, alternatively 0.1 to 10 wt %, alternatively 0.1 to 5 wt %, alternatively 0.1 to 1 wt %.

The amount of hydroxyl functionality in the polymer is from 0.01 wt % to 5 wt % based on the molecular weight of R+17 g/mol where in R is defined above, alternatively 0.1 to 5 wt %, alternatively 0.1 to 3 wt %, alternatively 0.1 to 1 wt %.

Preferred propylene polymer, preferably homopolymer, produced herein has an Mw of 20,000 up to 2,000,000 g/mol.

For higher molecular weight applications, preferred polymer, preferably homopolymer, produced herein has an Mw of 20,000 up to 2,000,000 g/mol, alternately 50,000 to 1,500,000 g/mol, alternately 100,000 to 1,300,000 g/mol, alternately 300,000 to 1,300,000 g/mol, alternately 500,000 to 1,300,000 g/mol.

Mn is number average molecular weight, Mw is weight average molecular weight, and Mz is z average molecular weight. Molecular weight distribution (MWD) is defined to be Mw divided by Mn. Unless otherwise noted, all molecular weight units (e.g., Mw, Mn, Mz) are g/mol.

The polymers of this invention may be blended and/or coextruded with any other polymer. Non-limiting examples of other polymers include linear low density polyethylenes, elastomers, plastomers, high pressure low density polyethylene, high density polyethylenes, isotactic polypropylene, ethylene propylene copolymers and the like.

Polymers produced by the process of the invention and blends thereof are useful in such forming operations as film, sheet, and fiber extrusion and co-extrusion as well as blow molding, injection molding, roto-molding. Films include blown or cast films formed by coextrusion or by lamination useful as shrink film, cling film, stretch film, sealing film or oriented films.

Experimental

General Considerations and Reagents.

All manipulations were performed under an inert atmosphere using glove box techniques unless otherwise stated. Benzene-$d_6$ (Cambridge Isotopes) (Sigma Aldrich) was degassed and dried over 3 Å molecular sieves prior to use.

Diisobutylaluminum hydride (DIBAL-H) was purchased from Akzo Nobel Surface Chemistry LLC and used as received. Triisobutyl aluminum (TIBAL) was purchased from Akzo Nobel and was used as received. 1,4-pentadiene, 1,5-hexadiene, 1,6-heptadiene, and 1,7-octadiene were purchased from Sigma Aldrich and purified by the following procedure prior to use. The diene was purged under nitrogen for 30 minutes and then this was stored over 3 Å molecular sieves for overnight. Further this was stirred with NaK (sodium-potassium alloy) for overnight and then filtered through basic alumina column prior to use.

Silica D-150-60A was obtained from the Asahi Glass Co., Ltd. or AGC Chemicals Americas, Inc.

Methylalumoxane (MAO) was obtained as a 30 wt % MAO in toluene solution from Albemarle (13.5 wt % Al/5.0 mmol/g).

SMAO is methylalumoxane treated silica and is prepared as follows: about 45 grams of DAVIDSON™ 948 silica calcined at 600° C. is slurried in 230 mL of toluene. MAO (79 g of a 30 wt % toluene solution, 351 mmol of Al) is added slowly to the slurry. The slurry is then heated to 80° C. and stirred for 1 hour. The slurry is filtered, washed three times with 70 mL of toluene and once with pentane. The solid is dried under vacuum overnight to give about 77 g of free flowing white solid.

Supported Catalyst 1:

(1,3-Me,nBuCp)$_2$ZrCl$_2$/SMAO is (1,3-Me,nBuCp)$_2$ZrCl$_2$ catalyst compound supported on SMAO (defined above) prepared using the general support method described in the supported catalyst preparation described in U.S. Pat. No. 6,180,736 except that the catalyst precursor (1,3-Me, nBuCp)$_2$ZrCl$_2$ and diisobutyl-7-octenylaluminum (1) were used. The supported catalyst had about 40 mmoles Zr per Kg of support, and about 6 mmoles Al per gram of support.

Supported Catalyst 2:

About 1.5 grams of Silica D-150-60A™ (Asahi Glass Company) was slurried in 14 milliters of toluene and cooled to −35° C. Methyl alumoxane (1.77 grams of a 20 wt % toluene solution) was added dropwise. After 3.75 hours the slurry was filtered and rinsed with 3×10 ml of toluene. The solids were reslurried in 10 ml of toluene and 0.13 grams of triisobutylaluminum was added and stirred for 15 minutes. A 34 mg amount of rac-dimethylsilyl bis(2-cyclopropyl-4-(3',5'-di-tert-butylphenyl)-indenyl) zirconium dichloride (synthesized according to US Patent Publication 2015/0025206) was added to the slurry. The slurry was heated to 100° C., stirred for one hour, filtered with 3×10 ml of toluene and one 10 ml rinse of pentane. The supported catalyst was dried under vacuum for two hours. A 1.453 gram amount of purple solid was obtained.

Supported Catalyst 3:

45.5 grams of DAVIDSON™ 948 silica calcined at 600° C. was slurried in 230 mL of toluene. MAO (79 g of a 30 wt % toluene solution, 351 mmol of Al) was added slowly to the slurry. The slurry was then heated to 80° C. and stirred for 1 hour. The slurry was filtered, washed three times with 70 mL of toluene and once with pentane. The solid was dried under vacuum overnight to give a 77 g of free flowing white solid.

A 0.71 gram amount of the MAO treated silica was slurried in 15 ml of toluene. A 11.6 milligram amount of dimethylsilylene(2,3,4,5-tetramethylcyclopentadienyl) (indenyl)zirconium dimethyl (as prepared below) was dissolved in 5 ml of toluene and added to the slurry. The slurry was stirred for 1 hour, filtered, rinsed with 3×15 ml of toluene and dried under vacuum. A 0.67 gram amount of supported catalyst was obtained. MI is Melt Index determined according to ASTM 1238, 190° C., 2.16 kg load. HLMI is High load melt index determined according to ASTM 1238, 190° C., 21.6 kg load. MIR is melt index ratio is MI divided by HLMI as determined by ASTM 1238.

EXAMPLES $^1$H-NMR Spectroscopic Characterization of Al Alkenyls.

The aluminum alkenyls presented here may be described using the formula Al($^i$Bu)$_x$(alkenyl)$_y$, where x+y=3. This formulation represents the observed average of organoaluminum species present in the mixture, which may include any of Al(alkyl)$_3$, Al(alkyl)$_2$(alkenyl), Al(alkyl)(alkenyl)$_2$, and Al(alkenyl)$_3$. $^1$H NMR spectroscopic studies were performed at room temperature using a Bruker 400 or 500 MHz NMR. Data was collected using samples prepared by dissolving 10-20 mg the compound in 1 mL of C$_6$D$_6$. Samples were then loaded into 5 mm NMR tubes for data collection. Data was recorded using a maximum pulse width of 45°, 8 seconds between pulses and signal averaging either 8 or 16 transients. The spectrum were normalized to protonated tetrachloroethane in the C$_6$D$_6$. The chemical shifts (δ) presented are relative to the residual protium in the deuterated solvent at 7.15 ppm.

Certain aluminum alkenyls may be described using the formula: ($^i$Bu)$_x$Al(oct-1-en-7-yl)$_y$, where x+y=3. This formulation represents the observed average of organoaluminum species present in the mixture, which may include Al($^i$Bu)$_3$, Al($^i$Bu)$_2$(oct-1-en-7-yl), Al($^i$Bu)(oct-1-en-7-yl)$_2$, Al(oct-1-en-7-yl)$_3$. In certain preparations the mixture may also be contaminated with z molar equivalents of a triene, such as 7-methylenepentadeca-1,14-diene. The amount of 7-methylenepentadeca-1,14-diene present is determined from the ratio of the integrated signals in the vinylidene region (4.65-4.9 ppm) to the signals in the aluminum-CH$_2$— region (0.2-0.65 ppm). The values of x and y are determined from the ratio of the integrated signals for the upfield Al-isobutyl resonances (observed as a doublet at ~0.3 ppm) to the upfield Al-octenyl resonances (observed as a multiplet at ~0.5 ppm).

Preparation of $^i$Bu$_{0.45}$Al(1-oct-7-ene-yl)$_{2.55}$ containing 0.27 molar equivalents of 7-methylenepentadeca-1,14-diene Triisobutylaluminum (0.810 g, 4.08 mmol) and 1,7-octadiene (9.00 g, 81.7 mmol) were combined in a thick-walled glass bottle. This was sealed and heated in an oil bath maintained at 150° C. After 20 minutes the mixture was cooled to ambient temperature and vented. The volatiles were removed by vacuum distillation at ambient temperature. Yield 1.68 g. $^1$H NMR (500 MHz, C$_6$D$_6$ solution): 5.9-5.7 (m, 3.03 H), 4.95-5.15 (m, 6.25 H), 4.7 (s, 0.54 H), 0.7-2.2 (several multiplets, 80.9 H), 0.4-0.6 (m, 5.11 H, Al-octenyl), 0.29 (d, 0.89H, Al-isobutyl). The relative amounts of Al-$^i$Bu, Al-(1-oct-7-ene-yl) and 7-methylenepentadeca-1,14-diene in the product mixture were determined by $^1$H NMR spectroscopy using the method described above.

Synthesis of Diisobutyl(oct-7-en-1-yl) aluminum, $^i$Bu$_2$Al(Oct=) (1)

A neat 1,7-octadiene (16.53 g, 150 mmol) was added drop wise to DIBAL-H (3.56 g, 25 mmol) at room temperature over a period of 5 minutes. The reaction mixture was either stirred at 45° C. for overnight or refluxed at 110° C. for 1 hour to form the title compound. The excess 1,7-octadiene from the reaction mixture was removed under the flow of dry nitrogen at room temperature. The residual 1,7-octadiene was then removed in vacuo for 30 minutes to obtain a colorless viscous oil of 1 (5.713 g, 91%). The product formation was confirmed by $^1$H NMR spectroscopy and based on the relative integration the molecular formula was assigned as (C$_4$H$_9$)$_{2.1}$Al(C$_8$H$_{15}$)$_{0.9}$. $^1$H NMR (400 MHz, benzene-d$_6$): δ=5.78 (m, 1H, =CH), 5.01 (m, 2H, =CH$_2$), 1.95 (m, 4H, —CH$_2$), 1.54 (m, 2H, $^i$Bu—CH), 1.34 (m, 6H, —CH$_2$), 1.04 (d, 12H, $^i$Bu—CH$_3$), 0.49 (t, 2H, Al—CH$_2$), 0.27 (d, 4H, $^i$Bu—CH$_2$) ppm.

Synthesis of Isobutyldi(oct-7-en-1-yl)aluminum, $^i$BuAl(Oct=)$_2$ (2)

A neat 1,7-octadiene (9.00 g, 81.8 mmol) was added drop wise to DIBAL-H (0.81 g, 7.2 mmol) at room temperature over 5 minutes. The resulting mixture was stirred under reflux at 110° C. for 60 minutes and then continuously stirring at 70° C. for overnight. The excess 1,7-octadiene from the reaction mixture was removed under the flow of dry nitrogen at room temperature. The residual 1,7-octadiene was then removed in vacuo for 30 minutes to obtain a colorless viscous oil of 2 (1.689 g, 79%). The product formation was confirmed by $^1$H NMR and based on the relative integration the molecular formula of was assigned as (C$_4$H$_9$)$_{1.15}$Al(C$_8$H$_{15}$)$_{1.85}$. $^1$H NMR (400 MHz, benzene-d$_6$): δ=5.81 (m, 2H, =CH), 5.05 (m, 4H, =CH$_2$), 2.03 (m, 8H, —CH$_2$), 1.59 (m, 1H, $^i$Bu—CH), 1.38 (m, 12H, —CH$_2$), 1.09 (d, 6H, $^i$Bu—CH$_3$), 0.51 (t, 4H, Al—CH$_2$), 0.31 (d, 2H, $^i$Bu—CH$_2$) ppm.

Figure 3:
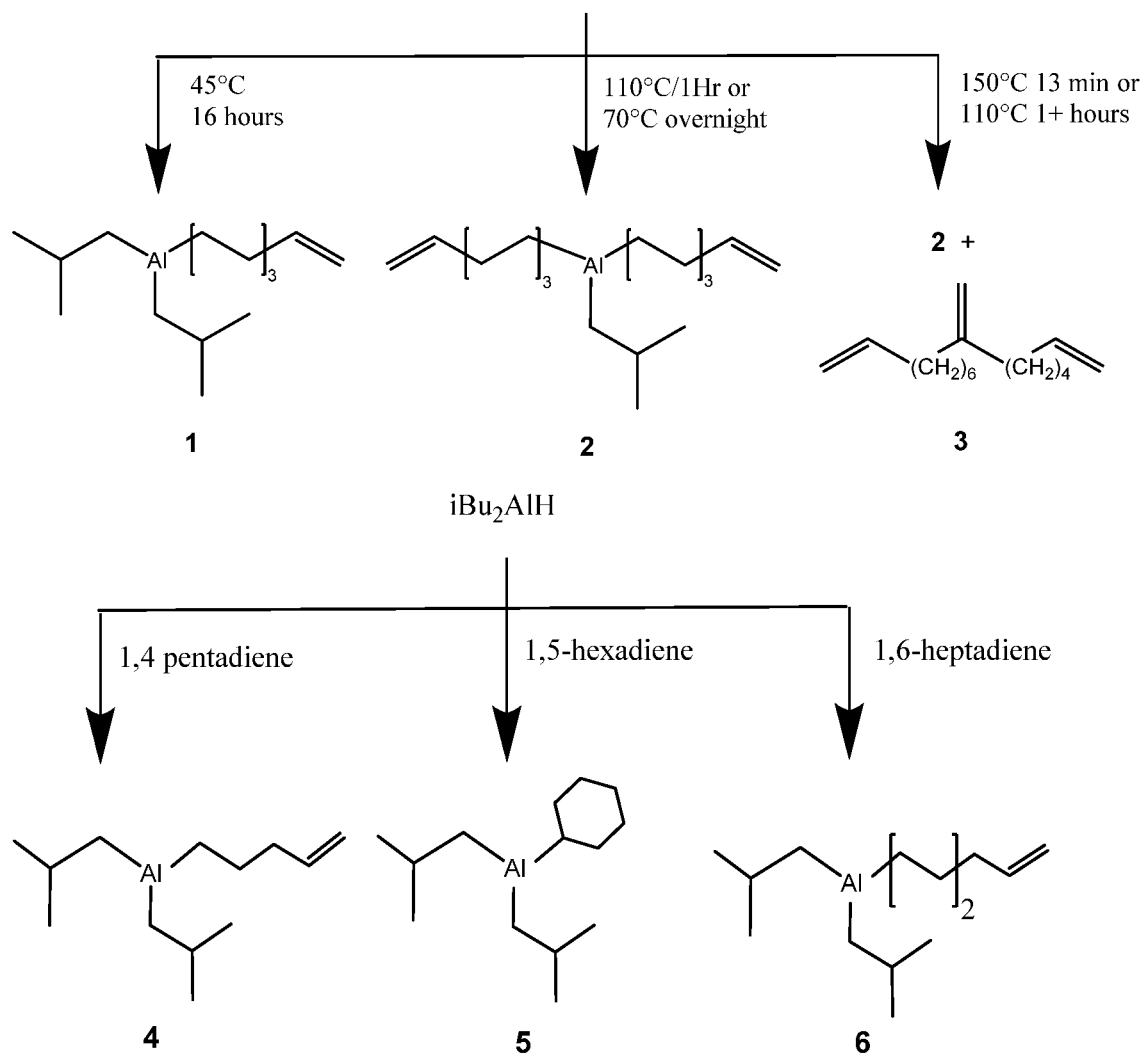
FIG. 3 is a drawing of some of the species produced in the Experimental Section.

General Considerations: Reaction of DIBAL-H with 1,7-octadiene (See FIG. 3) under mild conditions produces the mono-alkenyl aluminum complex 1 without the formation of triene side product (also called dimer). More robust reaction conditions are required to form the di-alkenyl aluminum complex 2, however care must be taken to exclude the formation of the triene 3. Intermediate temperatures such at 70° C. for overnight or 110° C. for 1 hr produces the di-alkenyl aluminum complex 2 without formation of the triene. Higher temperatures or prolonged heating at intermediate temperatures results in the formation of the triene 3.

Preparation of $^i$Bu$_{0.245}$Al(1-oct-7-ene-yl)$_{2.75}$ containing 0.32 molar equivalents of 7-methylenepentadeca-1,14-diene Triisobutylaluminum (1.00 g, 5.06 mmol) was loaded in a Parr vessel followed by 1,7-octadiene (11.2 g, 102 mmol, 20.1 equivalents). The Parr vessel was sealed and heated to 145° C. for 6 hours. The reactor was cooled, the liquid was isolated, excess diene was removed. The viscous liquid was diluted with pentane filtered and dried under vacuum. Obtained 1.6 grams of aluminum alkenyl with predominantly pendant octenyl groups Al(iBu)$_{(0.2449)}$(octenyl)$_{(2.755)}$. $^1$H NMR C$_6$D: δ: 0.292 (d), 0.468(br, m), 1.35-1.551(br, 1.99(m), 4.791(s), 4.983(m), 5.773(m).

Preparation of $^i$Bu$_{1.33}$Al(1-oct-7-ene-yl)$_{1.67}$

Triisobutylaluminum (4.41 g, 22.2 mmol, 1 eq) and 1,7-octadiene(49.1 g, 445 mmol, 20.0 eq) was added to a slightly chilled parr vessel. The vessel was heated to 112° C. with stirring overnight. The reactor was cooled to room temperature; and the reactor liquid was filtered, and dried under vacuum. $^1$H NMR analysis yields: Al((CH$_2$)$_6$CH=CH$_2$)$_{1.67}$(iBu)$_{1.33}$. Collected 7.69 g of viscous liquid. $^1$H NMR (C$_6$D$_6$): δ 0.29(d), 0.483(m), 1.068(d), 1.366(br, m), 2.011(br, m), 5.003(m), 5.797(m).
Complexes 4-7.

Synthesis of Diisobutyl(pent-4-en-1-yl)aluminum, $^i$Bu$_2$Al(Pen=) (4)

A neat DIBAL-H (0.244 g, 2 mmol) was added drop wise to 1,5-pentadiene (0.817 g, 12 mmol) over the period of 5 minutes and the reaction mixture was stirred at room temperature for overnight. The excess 1,5-diene was removed in vacuo to yield 4 (0.174 g, 42%). The product formation was confirmed by $^1$H NMR and based on the relative integration the molecular formula of was assigned as Al(C$_4$H$_9$)$_2$(C$_5$H$_9$). $^1$H NMR (400 MHz, benzene-d$_6$): δ=5.93 (m, 1H, =CH), 5.03 (m, 2H, =CH$_2$), 1.95 (m, 2H, $^i$Bu—CH), 1.78 (m, 4H, —CH$_2$), 1.08 (d, 12H, $^i$Bu—CH$_3$), 0.22 (d, 4H, $^i$Bu—CH$_2$), 0.08 (t, 2H, Al—CH$_2$).

Comparative Example

Synthesis of Cyclohexyldiisobutyl aluminum (5)

A neat DIBAL-H (1.06 g, 7.5 mmol) was added drop wise to 1,5-hexadiene (3.61 g, 45 mmol) over the period of 5 minutes and the reaction mixture was stirred at room temperature for 3 hours. The excess 1,5-hexadiene was removed in vacuo to obtain a colorless viscous oil of 5. The product formation was confirmed by $^1$H NMR and based on the relative integration the molecular formula of was assigned as Al(C$_4$H$_9$)$_2$(C$_7$H$_{13}$). $^1$H NMR (400 MHz, benzene-d$_6$): δ=$^1$HNMR (400 MHz, C$_6$D$_6$): δ 1.96 (m, 2H, —CH), 1.86-1.55 (m, 10H, —CH$_2$), 1.03 (d, 12H, $^i$Bu—CH$_3$), 0.45 (s, 1H, Al—CH), 0.33 (d, 4H, Al—CH$_2$) ppm.

Synthesis of (Hept-6-en-1-yl)diisobutylaluminum (6)

A neat DIBAL-H (0.122 g, 1 mmol) was added drop wise to 1,6-heptadiene (0.577 g, 6 mmol) over the period of 5 minutes and the reaction mixture was stirred at room temperature for overnight. The excess 1,6-heptadiene was removed in vacuo to obtain a colorless viscous oil of 6 (0.138 g, 57%). The product formation was confirmed by $^1$H NMR and based on the relative integration the molecular formula of was assigned as (C$_4$H$_9$)$_{1.95}$Al(C$_7$H$_{13}$)$_{1.05}$. $^1$H NMR (400 MHz, benzene-d$_6$): δ=5.83 (m, 1H, =CH), 5.09 (m, 2H, =CH$_2$), 2.06 (m, 2H, —CH$_2$), 1.95 (m, 2H, $^i$Bu—CH), 1.41 (m, 6H, —CH$_2$), 1.05 (d, 12H, $^i$Bu—CH$_3$), 0.38 (t, 2H, Al—CH$_2$), 0.26 (d, 4H, $^i$Bu—CH$_2$).

Synthesis of Me$_2$(2,3,4,5-Me$_4$Cp)(Ind)ZrMe$_2$ (7)

Lithium indenide (2.92 g, 23.9 mmol) was dissolved in 100 mL of THF. A THF solution of Me$_4$CpSiMe$_2$Cl (5.14 g, 23.9 mmol) was added to the solution. The solution was allowed to stir overnight. The reaction was then blown down, taken up in pentane and filtered through celite. The filtrate was then dried under vacuum to give 6.78 g of oil that was immediately taken to the next step.

The above oil (6.78 grams) was dissolved in diethyl ether and chilled to −35° C. $^n$BuLi (20.3 mL, 2.5M, 50.75 mmol) was added dropwise, the solution was allowed to stir over the weekend. The solution was blown down and vacuum dried to remove the ether. The solid was washed with pentane and dried under vacuum to give 2.7859 g of solid with roughly 0.75 eq of ether still attached. 33.94% yield. NMR (THF-d8) δ 0.549(s, br, 6H), 1.111(t, 4.61H, ether) 1.895(s, br, 6H) 2.103(s, br, 6H), 3.381(q, 3H, ether), 5.998(m, 1H), 6.439(m, br, 2H), 6.764(d, 1H), 7.306(d, br, 1H), 7.606(d, br, 1H).

ZrCl$_4$ (1.8197 g, 7.8085 mmol) was slurried in 50 mL of dichloromethane. The deprotanated ligand was added as a solid and washed down with 10 mL of diethyl ether, an additional 50 mL of dichloromethane was then added to the solution. The solution was stirred overnight. The mixture was filtered through celite, blown down, and dried under vacuum to give 2.7953 g of yellow solid, dimethylsilylene (2,3,4,5-tetramethylcyclopentadienyl (indenyl)zirconium dichloride, 78.74% 1H NMR (CD$_2$Cl$_2$) δ 0.940(s, 3H), 1.138(s, 3H), 1.865(d, 6H), 1.913(s, 3H) 1.925(s, 3H), 5.986(d, 1H), 7.030(m, 1H), 7.171(br, 1H), 7.303(d, 2H), 7.65(d, 1H).

Catalyst

Me$_2$Si(2,3,4,5-Me$_4$Cp)(Ind)ZrCl$_2$ (2.7659 g, 6.0840 mmol) was dissolved in 100 mL of dichloromethane. MeMgBr (5 mL of 3.0M in ether, 15 mmol) was added to the reaction via syringe. The reaction stirred overnight. The reaction was then filtered through celite; the solvent was removed. The product was dissolved in a toluene pentane solution and again filtered through celite. Recrystallization from a toluene pentane mixture to give 1.2776 g of material, 50.75% yield. $^1$H NMR (C$_6$D$_6$): δ −1.341 ppm(s, 3H), −0.182(s, 3H), 0.472(s, 3H), 0.643(s, 3H), 1.614(s, 3H), 1.700(s, 3H, 1.815(s, 3H] 1.832(s, 3H), 5.547(d, 1H), 6.881 (t, 1H), 7.033(d, 1H), 7.175(d, 1H), 7.283(d, 1H), 7.6(d, 1H).

Polymerizations

General Procedure for Polymerization in 2 L Reactor

A 2 L autoclave reactor was baked out at 100° C. for at least 1 hr. The reactor was cooled to room temperature. 2 mL of a 0.091 M tri-n-octyl aluminum ("TNOAL") solution in hexane was loaded into a catalyst tube as a scavenger and injected into the reactor with nitrogen gas. The nitrogen in the reactor was vented down until the pressure was just above ambient pressure. 600 mL of isohexane was added to the reactor. The reactor was heated to 85° C. and the stir rate was set to 500 rpm. When the proper temperature had been reached, 20 psi of ethylene was added to the reactor. A second catalyst tube containing the catalyst and 2 mL of pentane was then attached to the reactor. The catalyst was pushed into the reactor with 200 mL of isohexane. A constant ethylene pressure, approximately 130 psi on top of the pressure of isohexane, approximately 190 psi total, was bubbled through the cat tube and the reactors dip tube. The reactor stirred for 30 min before being vented and cooled down. The polymer was collected in a beaker and placed under air purge to evaporate the isohexane and collect the dry polymer.

The polymerization examples below were performed according to the general procedure above unless indicated otherwise.

Polymerization Example 1 iBu$_2$Al(1-oct-7-ene-yl) (1) (6 mL of a 0.0913M hexane solution) was injected into a 2 L autoclave reactor that had previously been baked at 100° C. for at least 1 hour and then cooled to room temperature. 300 mL of isohexane were added, and 30 mL of 1-hexene were added with an additional 400 mL of isohexane. The stir rate was set to 500 rpm and the temperature was raised to 85° C. 60 psi of ethylene was placed in the reactor. A catalyst tube loaded with (1,3-Me, nBuCp)$_2$ZrCl$_2$/SMAO (1)(56.1 mg) and 2 mL of pentane was attached to the reactor and pushed in with ethylene. The ethylene was initially 171 psi over isohexane, but was lowered to 126 psi over isohexane. The reactor ran for 40 minutes before being vented and cooled down. The polymer was collected in a beaker and placed under air purge to evaporate the solvents, which yielded 57.1 g of white polymer granules.

Polymerization Example 2 iBu$_2$Al(1-oct-7-ene-yl) (1)(10 mL of a 0.0913M hexane solution) was injected into a reactor that had previously been baked at 100° C. for at least 1 hr and then cooled to room temperature. 300 mL of isohexane was then added next. 30 mL of 1-hexene was added with an additional 400 ms of isohexane. The stir rate is set to 500 rpm and the temperature was raised to 85° C. 60 psi of ethylene was placed in the reactor. A catalyst tube loaded with Catalyst 1 (bis(1,3-Me, nBuCp)ZrCl$_2$/SMAO) (54.4 mg) and 2 mL of pentane was attached to the reactor and pushed in with ethylene. The ethylene pressure was set to 139 psi over isohexane. The reactor ran for 40 minutes before being vented and cooled down. The polymer was collected in a beaker and placed under air purge to evaporate the solvents, which yielded 53.368 g of white polymer granules.

Polymerization Example 3 iBu$_2$Al(1-oct-7-ene-yl) (1)(20 mL of a 0.0913M hexane solution) was injected into a reactor that had previously been baked at 100° C. for at least 1 hr and then cooled to room temperature. 300 mL of isohexane was added; followed by 30 mL of 1-hexene and an additional 400 mL of isohexane. The stir rate was set to 500 rpm and the temperature was raised to 85° C., then 60 psi of ethylene is placed in the reactor. A catalyst tube loaded with Catalyst 1 (bis(1,3-Me, nBuCp)ZrCl$_2$/SMAO) (57.8 mg) and 2 mL of pentane is attached to the reactor and pushed in with ethylene. The ethylene pressure was set to 132 psi over isohexane. The reactor ran for 40 minutes before being vented and cooled down. The polymer was collected in a beaker and placed under air purge to evaporate the solvents, which yielded 53.093 g of white polymer granules.

Polymerization Example 4 iBu$_2$Al(1-oct-7-ene-yl) (1)(20 mL of a 0.0910M hexane solution) was injected into a reactor that had previously been baked at 100° C. for at least 1 hr and then cooled to room temperature. 300 mL of isohexane was added; followed by 30 mL of 1-hexene and an additional 500 mL of isohexane. The stir rate was set to 500 rpm and the temperature is raised to 85° C., then 60 psi of ethylene was placed in the reactor. A catalyst tube loaded with Catalyst 1 (bis(1,3-Me,nBuCp) ZrCl$_2$/SMAO) (52.8 mg) and 2 mL of pentane was attached to the reactor and pushed in with ethylene. The ethylene pressure was set to 132 psi over isohexane. The reactor ran for 40 minutes. The reactor was cooled to 45° C. and depressurized. The reactor was then pressurized up with 120 psi of 6% wt O$_2$ in N$_2$. This was allowed to stir for 20 min before being vented out. The polymer was collected in a beaker and placed under air purge to evaporate the solvents, which yielded 44.285 g of white polymer granules.

Polymerization Example 6 iBu$_2$Al(1-oct-7-ene-yl) (1)(40 mL of a 0.0910M hexane solution) was injected into a reactor that had previously been baked at 100° C. for at least 1 hr and then cooled to room temperature. 600 mL of propylene was then added to the reactor, the stir rate was set to 500 rpm and the temperature to 70° C. A catalyst tube containing 59.4 mg of Catalyst 2 ((rac-dimethylsilyl bis(2-cyclopropyl-4-(3',5'-di-tert-butylphenyl)-indenyl) zirconium dichloride on triisobutyl aluminum and MAO treated D-150-60A) and 2 mL of pentane was attached to the reactor and pushed in with ethylene. 20 psi of ethylene was added to the reactor through the catalyst tube. The reactor was run for 40 minutes before being vented and cooled down. The polymer was collected in a beaker and placed under air purge to evaporate the solvents, which yielded 18.6 grams of polymer.

$^1$H NMR analysis of the polymers yielded a linear low density polyethylene that contained both pendant —(CH$_2$)$_2$CH$_2$CH$_2$OH and —(CH$_2$)$_4$—CH$_2$CH$_2$OAl—O type species that are consistent with schemes I and II (see FIG. 1). $^1$H NMR for the polymer was run on either a 500 MHz or 600 MHz instrument. It was run at 120° C. in tetrachloroethane-d$_2$ with a 30° pulse, 512 scans, and 5 second delay. The chemical shifts for the Al—O—CH$_2$ species was a multiplet at 3.98 ppm and the HO—CH$_2$ species had a triplet at 3.5 ppm (reference: R. Sugimoto et.al Bulletin of the Chemical Society of Japan, 2015 advance publication doi:10.1246/bcsj.20150171). Branching per 1000 carbons was calculated by taking the Area of the CH$_2$ species/total area*1000.

Polymerization Example 7 iBu$_2$Al(1-oct-7-ene-yl) (1) (1.03 grams) was injected into a reactor that had previously been baked at 100° C. for at least 1 hr and then cooled to room temperature. 300 mL of isohexane was added; followed by 10 mL of 1-hexene an additional 500 mL of isohexane. The stir rate was set to 500 rpm and the temperature is raised to 85° C. 60 psi of ethylene was placed in the reactor. A catalyst tube loaded with Catalyst 3 (Me$_2$Si(2,3,4,5-Me$_4$Cp) (Ind)ZrMe$_2$/SMAO (0.0389 mmolZr/gram SMAO) (50.1 mg) and 2 mL of pentane was attached to the reactor and pushed in with ethylene. The ethylene pressure was set to 132 psi over isohexane. The reactor ran for 40 minutes, then cooled to 45° C. This was allowed to stir for 20 min before being vented out. The polymer was collected in a beaker and placed under air purge to evaporate the solvents, which yielded 46.8 g of white polymer granules.

Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, I$_{DRI}$, using the following equation:

$$c = K_{DRI} I_{DRI}/(dn/dc)$$

where K$_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in Summary of Polymerization Experiments

| Supported Catalyst (grams) | Ex. | Yield (grams PE) | HLMI (dg/min) | MI (dg/min) | MIR | Mw (g/mol) | Mn (g/mol) | Mw/Mn | Hexene (wt %) | —CH$_2$—OAl/ 1000 C | —CH$_2$OH/ 1000 C |
|---|---|---|---|---|---|---|---|---|---|---|---|
| 0.0561 | 1 | 57.1 | 4.257 | 0.199 | 21.4 | 189759 | 86316 | 2.20 | 8.4 | 0.50 | 0 |
| 0.0544 | 2 | 53.4 | 2.486 | 0.142 | 17.5 | 218239 | 92882 | 2.35 | 5.2 | 0.31 | 0 |
| 0.0578 | 3 | 53.1 | 3.662 | 0.218 | 16.8 | 207046 | 91565 | 2.26 | 5.7 | 0.58 | 0 |
| 0.0528 | 4 | 44.3 | 3.57 | 0.215 | 16.6 | 205362 | 87432 | 2.35 | 5.8 | 0.40 | 0.23 |
| 0.0594* | 6 | 18.6 | | | | | | | | | 2.09 |
| 0.0501 | 7 | 46.8 | 9.265 | 0.133 | 69.7 | | | | | 0.17 | 0.27 |

*propylene monomer used not ethylene monomer to yield isotactic polypropylene
**GPC-DRI Hexene wt % is estimated by $^1$H NMR.

Melt Index (MI, also referred to as I2) is measured according to ASTM D1238 at 190° C., under a load of 2.16 kg unless otherwise noted. High Load Melt Index (HLMI, also referred to as I21) is the melt flow rate measured according to ASTM D-1238 at 190° C., under a load of 21.6 kg. Melt Index Ratio (MIR) is the ratio of the high load melt index to the melt index, or I21/I2.

Gel Permeation Chromotography

Mw, Mn, and Mw/Mn are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein.

g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, ΔR(θ) is the measured excess Rayleigh scattering intensity at scattering angle θ, c is the polymer concentration determined from the DRI analysis, A$_2$ is the second virial coefficient. P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\theta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the GPC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits.

The branching index $g'_{vis}$ is defined as:

$$g'_{vis} = \frac{[\eta]_{avg}}{k M_v^\alpha}$$

$M_v$ is the viscosity-average molecular weight based on molecular weights determined by LS analysis. Z average branching index ($g'_{z_{ave}}$) is calculated using Ci=polymer concentration in the slice i in the polymer peak times the mass of the slice squared, $M_i^2$.

All molecular weights are weight average unless otherwise noted. All molecular weights are reported in g/mol unless otherwise noted.

All documents described herein are incorporated by reference herein for purposes of all jurisdictions where such practice is allowed, including any priority documents, related applications, and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. An aluminum vinyl-transfer agent represented by the formula:

$Al(R')_{3-v}(R)_v$, wherein each R', independently, is methyl, ethyl, propyl, butyl, pentyl, hexyl, heptyl, octyl, nonyl, decyl, undecyl, dodecyl, or an isomer thereof; each R, independently, is represented by the formula:

—(CH$_2$)$_n$CH═CH$_2$ where n is an integer from 6 to 18; and v is 2.

2. The aluminum vinyl-transfer agent of claim 1, wherein R is octenyl.

3. The aluminum vinyl-transfer agent of claim 1, wherein R' is methyl, ethyl, propyl, isobutyl, or butyl.

4. The aluminum vinyl-transfer agent of claim 1, wherein the aluminum vinyl-transfer agent is free of coordinating polar solvents.

5. The aluminum vinyl-transfer agent of claim 1, wherein the aluminum vinyl-transfer agent includes, but is not limited to, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum.

6. The aluminum vinyl-transfer agent of claim 1, wherein the aluminum vinyl-transfer agent comprises mixtures comprising one or more aluminum vinyl-transfer agents selected from isobutyl-di(oct-7-en-1-yl)-aluminum, isobutyl-di(dec-9-en-1-yl)-aluminum, isobutyl-di(non-8-en-1-yl)-aluminum, and isobutyl-di(hept-6-en-1-yl)-aluminum.

7. An aluminum vinyl-transfer agent represented by the formula:

$Al(R')_{3-v}(R)_v$, wherein each R', independently, is methyl, ethyl, propyl, butyl, pentyl, hexyl, heptyl, octyl, nonyl, decyl, undecyl, dodecyl, or an isomer thereof; each R, independently, is represented by the formula:

—(CH$_2$)$_n$CH═CH$_2$ where n is an integer from 6 to 18; and v is from about 2 to less than 3, and wherein the aluminum vinyl transfer group is isobutyl-di(oct-7-en-1-yl)-aluminum, isobutyl-di(dec-9-en-1-yl)-aluminum, isobutyl-di(non-8-en-1-yl)-aluminum, or isobutyl-di(hept-6-en-1-yl)-aluminum.

8. An aluminum vinyl-transfer agent represented by the formula:

$Al(R')_{3-v}(R)_v$, wherein R' is isobutyl, R is octenyl, and v is 2.

* * * * *